United States Patent
Carbone et al.

(10) Patent No.: US 11,452,405 B2
(45) Date of Patent: Sep. 27, 2022

(54) USER INTERFACE FOR A TOASTER

(71) Applicant: Revolution Cooking, LLC, Potomac, MD (US)

(72) Inventors: Philip C. Carbone, North Reading, MA (US); Shannon Galvin, Chevy Chase, MD (US); Kristin Cefalo, Boston, MA (US); Ryan O'Donnell, Ipswich, MA (US); Richard Simmers, Boxford, MA (US); Joyce Tu, Arlington, MA (US); Jay Hunt, Beaver Falls, PA (US); Martin Fisher, Crownsville, MD (US); James Poon, Woburn, MA (US); Eric David Cohen, Wellesley, MA (US)

(73) Assignee: Revolution Cooking, LLC, Potomac, MD (US)

( * ) Notice: Subject to any disclaimer, the term of this patent is extended or adjusted under 35 U.S.C. 154(b) by 0 days.

(21) Appl. No.: 17/128,329

(22) Filed: Dec. 21, 2020

(65) Prior Publication Data
US 2021/0106175 A1    Apr. 15, 2021

Related U.S. Application Data

(63) Continuation of application No. PCT/US2019/040842, filed on Jul. 8, 2019, which is
(Continued)

(51) Int. Cl.
*A47J 37/08*        (2006.01)

(52) U.S. Cl.
CPC ....... *A47J 37/0857* (2013.01); *A47J 37/0842* (2013.01); *A47J 37/0871* (2013.01)

(58) Field of Classification Search
CPC .... A47J 37/06; A47J 37/0635; A47J 37/0647; A47J 37/08; A47J 37/0807;
(Continued)

(56) References Cited

U.S. PATENT DOCUMENTS

| 2013/0092680 | A1 | 4/2013 | Cartwright et al. |
| 2014/0157994 | A1 | 6/2014 | Ryan et al. |

(Continued)

OTHER PUBLICATIONS

International Search Report and Written Opinion for International Application No. PCT/US2019/040842 dated Oct. 24, 2019.
(Continued)

*Primary Examiner* — Hung D Nguyen
(74) *Attorney, Agent, or Firm* — Wolf, Greenfield & Sacks, P.C.

(57) ABSTRACT

A toaster includes a housing that defines one or more cooking cavities. Each cooking cavity has a lift to lower and raise a food product inside the cooking cavity depending on food product type, and heating elements to cook the food product arranged inside the cooking cavity. The toaster includes a user interface operable to control a cooking cycle inside the one or more cooking cavities. The user interface can be used to select a combination of food product, cooking mode, and doneness level, and to initiate a cooking cycle performed by the toaster.

20 Claims, 45 Drawing Sheets

Related U.S. Application Data a continuation of application No. 29/680,505, filed on Feb. 15, 2019, now Pat. No. Des. 926,206.

(60) Provisional application No. 62/695,185, filed on Jul. 8, 2018, provisional application No. 62/695,182, filed on Jul. 8, 2018, provisional application No. 62/695,178, filed on Jul. 8, 2018.

(58) Field of Classification Search
CPC .. A47J 37/0814; A47J 37/0842; A47J 37/085; A47J 37/0857; A47J 37/0871; A47J 36/32; A47J 36/321
USPC ......... 99/324, 326, 385, 387, 389, 391, 392, 99/393, 400
See application file for complete search history.

(56) References Cited

U.S. PATENT DOCUMENTS

| | | | |
|---|---|---|---|
| 2014/0157996 A1 | 6/2014 | Korbin | |
| 2014/0352549 A1 | 12/2014 | Upston et al. | |
| 2017/0099988 A1 | 4/2017 | Matloubian et al. | |
| 2017/0322632 A1* | 11/2017 | Kovach | G06F 3/167 |

OTHER PUBLICATIONS

International Preliminary Report on Patentability for International Application No. PCT/US2019/040842 dated Jan. 21, 2021.

* cited by examiner

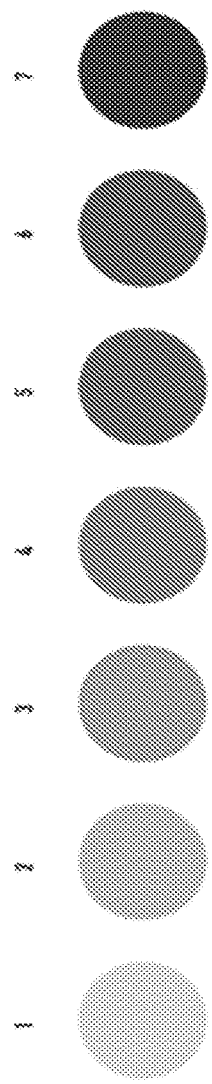

USER INTERFACE FOR A TOASTER

This application is a continuation of International Application No. PCT/US2019/040842, filed Jul. 8, 2019, which claims priority to U.S. Provisional Application No. 62/695,178, titled USER INTERFACE FOR A TOASTER, filed Jul. 8, 2018, U.S. Provisional Application No. 62/695,182, titled DONENESS SELECTOR FOR A TOASTER, filed Jul. 8, 2018, U.S. Provisional Application No. 62/695,185, titled CRUMB TRAY CLEANING REMINDER FOR A TOASTER, filed Jul. 8, 2018, and U.S. Design patent application Ser. No. 29/680,505, titled DISPLAY SCREEN WITH GRAPHICAL USER INTERFACE FOR A COOKING APPLIANCE, filed Feb. 15, 2019, the disclosures of which are hereby incorporated by reference in their entireties.

BACKGROUND

Toasters typically include controls for selecting a particular level of doneness or brownness for toasting a food product such as a slice of bread. Additionally, toasters typically include controls for selecting various cooking modes such as a bagel cooking mode and a frozen/defrost cooking mode. These controls are typically located on the exterior surface of the toaster, and are typically push buttons.

As toaster technology improves to include additional types of cooking modes and features, the placement of controls on the exterior surface of a toaster can become cluttered and confusing. Therefore, improvements are needed to provide a user interface for a toaster that is both intuitive and enhances user experience.

SUMMARY

The present disclosure relates generally to cooking appliances, and in particular, to a toaster having a user interface for selecting various combinations of food product, cooking mode, and doneness level.

In one possible configuration and by non-limiting example, the toaster includes a user interface having a plurality of touch sensitive icons on a single screen that can be used to select a combination of food product, cooking mode, and doneness level, and to initiate a cooking cycle performed by the toaster. In one aspect, the disclosed technology relates to a toaster comprising a housing that defines one or more cooking cavities. Each cooking cavity has a lift to lower and raise a food product inside the cooking cavity, and heating elements to cook the food product arranged inside the cooking cavity. The toaster includes a user interface operable to control a cooking cycle inside the one or more cooking cavities. The user interface is configured to display a landing screen. The landing screen comprising a plurality of touch sensitive icons on a single screen that can be used to select a combination of food product, cooking mode, and doneness level, and to initiate a cooking cycle performed by the toaster.

In some examples, the single screen includes an icon that can be selected to save the selected combination of food product, cooking mode, and doneness level to a user profile. The selected combination of food product, cooking mode, and doneness level can be selected from the user profile to avoid manually entering a new combination of food product, cooking mode, and doneness level when the toaster initiates a new cooking cycle. In some examples, multiple combinations of food product, cooking mode, and doneness level can be saved to the user profile. In some examples, multiple user profiles can be saved to a non-transitory memory of the toaster, each user profile having one or more combinations of food product, cooking mode, and doneness level.

In some examples, the user interface is configured to display a cooking screen to indicate that the food product is being cooked by the toaster. In some examples, the cooking screen includes a cancel icon that can be selected to cancel the cooking cycle before the cooking cycle is completed.

In some examples, the user interface is configured to display a countdown screen that shows a time remaining for completing the cooking cycle. In some examples, the countdown screen includes a cancel icon that can be selected to cancel the cooking cycle before cooking cycle is completed.

In some examples, the user interface is configured to display a finished screen to indicate that the food product is ready to be removed from the toaster. In some examples, the finished screen includes an icon that can be selected to save the selected combination of food product, cooking mode, and doneness level to a user profile after the cooking cycle is completed. In some examples, the user interface is configured to display a clock screen showing the time of day when the toaster is in an idle mode.

In another possible configuration and by non-limiting example, the toaster includes a user interface having a doneness selector that displays an image of a selected food product that changes color based on a selected doneness level. In one aspect, the disclosed technology relates to a toaster comprising: a housing that defines one or more cooking cavities, each cooking cavity having a lift to lower and raise a food product inside the cooking cavity, and heating elements to cook the food product arranged inside the cooking cavity; and a user interface operable to control a cooking cycle inside the one or more cooking cavities, the user interface configured to display a landing screen; the landing screen having a doneness selector that displays an image of a selected food product that changes color based on a selected doneness level. In some examples, the image of the selected food product is from a group consisting of a slice of bread, a bagel, an English Muffin, a waffle, and a pastry.

In some examples, the doneness selector includes a bar with a pointer that can be moved on the user interface from left to right and from right to left to adjust a doneness level for the selected food product. The pointer can be moved along the bar by touching the user interface and sliding the pointer along the bar. The color of the image of the selected food product changes based on a doneness level selected by the pointer. In one example, the color of each doneness level corresponds to an AHAM T-1-2016 standard. The user interface with the doneness selector visually depicts different shades of color that each represent a doneness level for toasting a food product by the toaster.

In another example, after a doneness level is selected using the doneness selector, the landing screen displays a start icon that can be selected to initiate a cooking cycle. The landing screen includes a save icon that can be selected to save a selected combination of food product, cooking mode, and doneness level to a user profile.

In another possible configuration and by non-limiting example, a toaster includes a user interface operable to control a cooking cycle of the toaster, and to display a clean crumb tray reminder to empty a crumb tray of the toaster after a predetermined number of toasting cycles. In this aspect, a toaster comprises a housing defining one or more cooking cavities, each cooking cavity having a lift to lower and raise a food product inside the cooking cavity, and heating elements to cook the food product arranged inside the cooking cavity; and a user interface operable to control a cooking cycle of the toaster, and to display a clean crumb tray reminder screen to empty a crumb tray of the toaster after a predetermined number of toasting cycles.

In some examples, the user interface is configured to display a clean crumb tray reminder adjustment screen having a touch sensitive icon that can be used to select a frequency for displaying the clean crumb tray reminder screen. The clean crumb tray reminder adjustment screen includes a selector icon to enable the clean crumb tray reminder screen or to disable the clean crumb tray reminder screen. The clean crumb tray reminder adjustment screen may further include a menu that displays one or more options for selecting a frequency for displaying the clean crumb tray reminder screen. The one or more options for selecting a frequency may include after every use, one time per week, or one time per month. In some examples, the one or more options for selecting a frequency are displayed as a number of toasting cycles. The clean crumb tray reminder adjustment screen may further include a save icon that can be selected to save a selected frequency for displaying the clean crumb tray reminder screen.

In some examples, the display of the clean crumb tray reminder screen is determined based on a fixed number of toasting cycles. The clean crumb tray reminder screen can be displayed on the user interface after a selected frequency is reached.

In some examples, the clean crumb tray reminder screen includes a message to clean the crumb tray of the toaster. In some examples, the clean crumb tray reminder screen remains on the user interface until a clear icon on the clean crumb tray reminder screen is selected. In some examples, the clean crumb tray reminder screen is a lock-out feature that prevents a user from using the toaster until the crumb tray is cleaned or a clear icon is selected on the clean crumb tray reminder screen.

In another aspect, a toaster comprises a housing that defines one or more cooking cavities, each cooking cavity having a lift to lower and raise a food product inside the cooking cavity, and heating elements to cook the food product arranged inside the cooking cavity; and a user interface operable to control a cooking cycle inside the one or more cooking cavities, the user interface configured to display a landing screen; the landing screen comprising a plurality of touch sensitive icons on a single screen that can be used to select a combination of food product, cooking mode, and doneness level, and to initiate a cooking cycle performed by the toaster; and the user interface is operable to display one or more messages to provide information on the status of the cooking cycle including a function performed by the heating elements of the toaster.

In some examples, the landing screen includes a food product selector having icons each representing a food product that can be selected for toasting by the toaster, wherein the food selector icons are photograph images of a food product. The user interface is configured to detect a hand gesture to select a food product icon, and in response to detecting the hand gesture, the user interface automatically moves the selected food product icon to the center of the food product selector and enlarges the selected food product icon. The user interface displays the selected food product icon about 40-60% larger than the unselected food product icons that are displayed on opposite sides of the selected food product icon. The user interface further displays a message below the selected food product icon that identifies the food product icon as a pastry, an English muffin, a slice of toast, a bagel, or a waffle.

In some examples, the landing screen includes a cooking mode selector that includes cooking modes identified as fresh, frozen, and reheat, each cooking mode determining a toasting algorithm performed by the toaster. The user interface is configured to detect a hand gesture to select a cooking mode, and in response to detecting the hand gesture, the user interface automatically moves a selector icon over the selected cooking mode to highlight the selected cooking mode on the landing screen.

In some examples, the landing screen includes a doneness selector having doneness icons each representing a doneness level, the user interface being configured to detect a hand gesture to select a doneness icon. In response to detecting a hand gesture, the user interface automatically moves a selector icon over a selected doneness icon and displays a numerical value of a doneness level associated with the selected doneness icon. In some examples, the color of the doneness icons varies depending on a doneness level associated with each doneness icon. In some examples, the color of the doneness icons progressively increase in darkness to represent higher doneness levels. In some examples, the user interface changes the color of the selector icon based on the selected doneness icon. In some examples, the user interface changes the color of the selected food product icon based on the selected doneness icon.

The user interface transitions to a cooking screen in response to detecting a hand gesture selecting a start icon, the cooking screen including an image of the food product selected in the food product selector, the color of the image corresponding to the doneness level selected in the doneness selector. The cooking screen further includes a message box displaying a message indicating a status of the cooking cycle. The message box displays a message describing a function being performed by the heating elements of the toaster. The cooking screen includes a cancel icon that is selectable to cancel the cooking cycle before the cooking cycle is completed.

In some examples, the landing screen includes a save icon that can be selected to save a selected combination of food product, cooking mode, and doneness level to a user profile. In some examples, the landing screen includes a doneness selector having a bar with a pointer that can be moved on the user interface from left to right and from right to left to adjust a doneness level for a selected food product. In some examples, the user interface displays a clean crumb tray reminder screen to empty a crumb tray after a predetermined number of toasting cycles.

In some examples, the toaster calculates a cooking cycle time based the combination of food product, cooking mode, and doneness level selected on the user interface, and an ambient heat in the cooking cavity and a line voltage reading. In some examples, the toaster displays on the user interface a first type of message for a first portion of the cooking cycle, a second type of message for a second portion of the cooking cycle; a third type of message when 10-15 seconds of time remains in the cooking cycle; and a fourth type of message when the cooking cycle is complete and the food product is ready to be removed from the cooking cavity. In some examples, the toaster lowers different types of food products to different locations within the cooking cavity based on the size of the food product selected on the user interface.

A variety of additional inventive aspects will be set forth in the description that follows. The inventive aspects can relate to individual features or combinations of features. It is to be understood that both the forgoing general description and the following detailed description are exemplary and explanatory, and are not restrictive of the broad inventive concepts upon which the examples disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 6 is a view of different shades of color, each shade of color representing a doneness level for the user interface.

DETAILED DESCRIPTION

Figure 1:
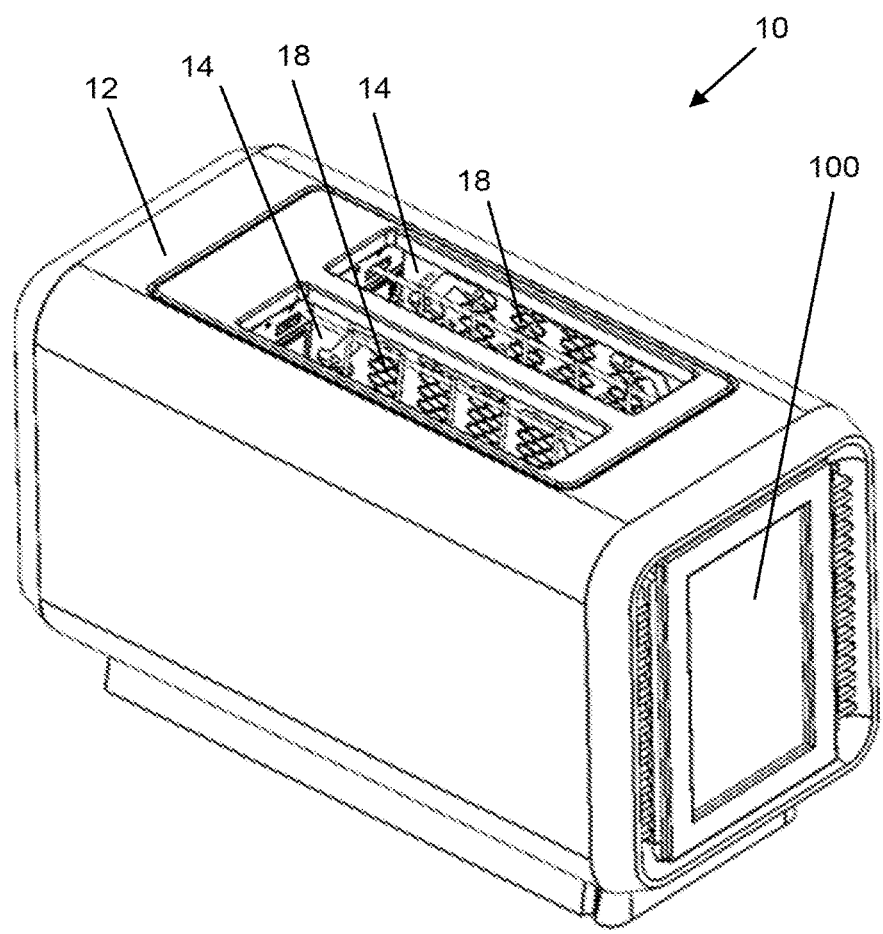
FIG. 1 is an isometric view of a toaster in accordance with an example embodiment of the present disclosure.

Various embodiments of the present invention will be described in detail with reference to the drawings, wherein like reference numerals represent like parts and assemblies throughout the views. Reference to various embodiments does not limit the scope of the invention, which is limited only by the scope of the claims attached hereto. Any examples set forth in this specification are not intended to be limiting and merely set forth some of the many possible embodiments for the claimed invention.

FIG. 1 is an isometric view of a toaster 10 in accordance with an example embodiment of the present disclosure. The toaster 10 includes a housing 12 that defines one or more cooking cavities 14. A lift (not shown) is included in each cooking cavity 14 to lower and raise food products such as slices of bread, bagels, English muffins, waffles, pastries etc. inside the cooking cavities 14. Heating elements 18 are located inside each cooking cavity 14. The toaster 10 operates to supply energy to the heating elements 18 to toast and/or cook the food products arranged inside the cooking cavities 14. The toaster 10 includes a user interface 100 operated by a user to control a cooking cycle inside the one or more cooking cavities 14.

Figure 2:
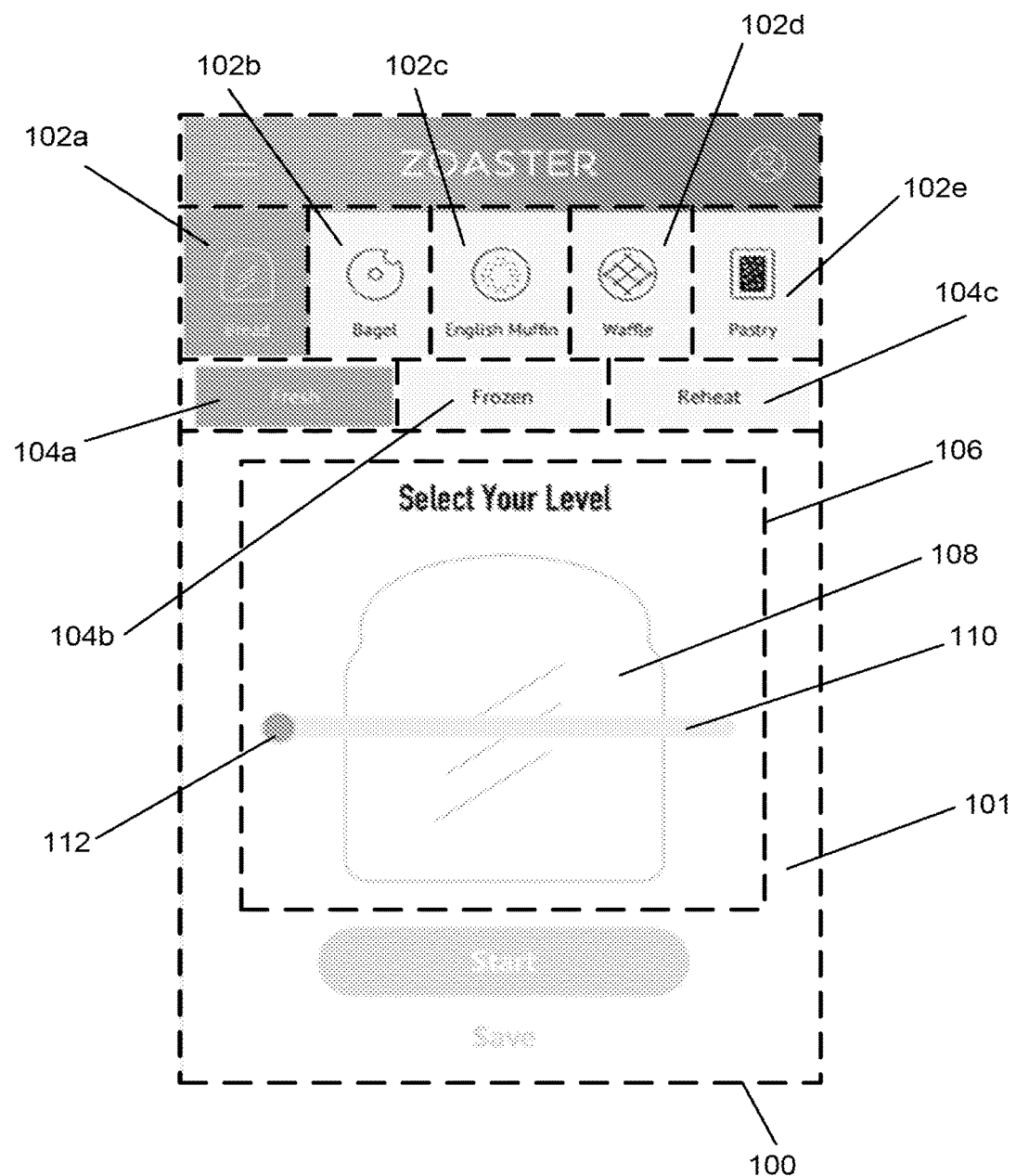
FIG. 2 is a view of a user interface that is suitable for use with the toaster of FIG. 1, the user interface displaying a landing screen.

FIG. 2 is a view of the user interface 100 displaying a landing screen 101. The user interface 100 is a touchscreen that can receive user inputs layered on top of an electronic visual display. Inputs received from the user interface 100 control an information processing system that includes at least one processor, and a memory that stores instructions that can be performed by the at least one processor, to control the cooking cycle inside the cooking cavities 14.

The processor can include one or more central processing units (CPU). In some examples, the processor additionally or alternatively includes one or more digital signal processors, field-programmable gate arrays, or other electronic circuits.

The memory can include at least some form of computer readable media including non-transitory computer readable storage media. Computer readable media includes any available media that can be accessed by the processor. By way of example, computer-readable media can include volatile and nonvolatile, removable and non-removable media implemented in any device configured to store information such as computer readable instructions, data structures, program modules, or other data. Computer readable media includes, but is not limited to, random access memory, read only memory, electrically erasable programmable read only memory, flash memory and other memory technology, or any other medium that can be used to store the desired information and that can be accessed by the processor.

The landing screen 101 includes a first set of icons 102a-102e. Each of the first set of icons 102a-102e represents a food product that can be selected for toasting and/or cooking by the toaster 10. For example, a slice of bread 102a, a bagel 102b, an English Muffin 102c, a waffle 102d, and a pastry 102e can each be selected for toasting and/or cooking by the toaster 10. The landing screen 101 can include additional icons representing additional food products as needed. In some examples, the icon 102a that represents a slice of bread is a default selection.

Figure 3:
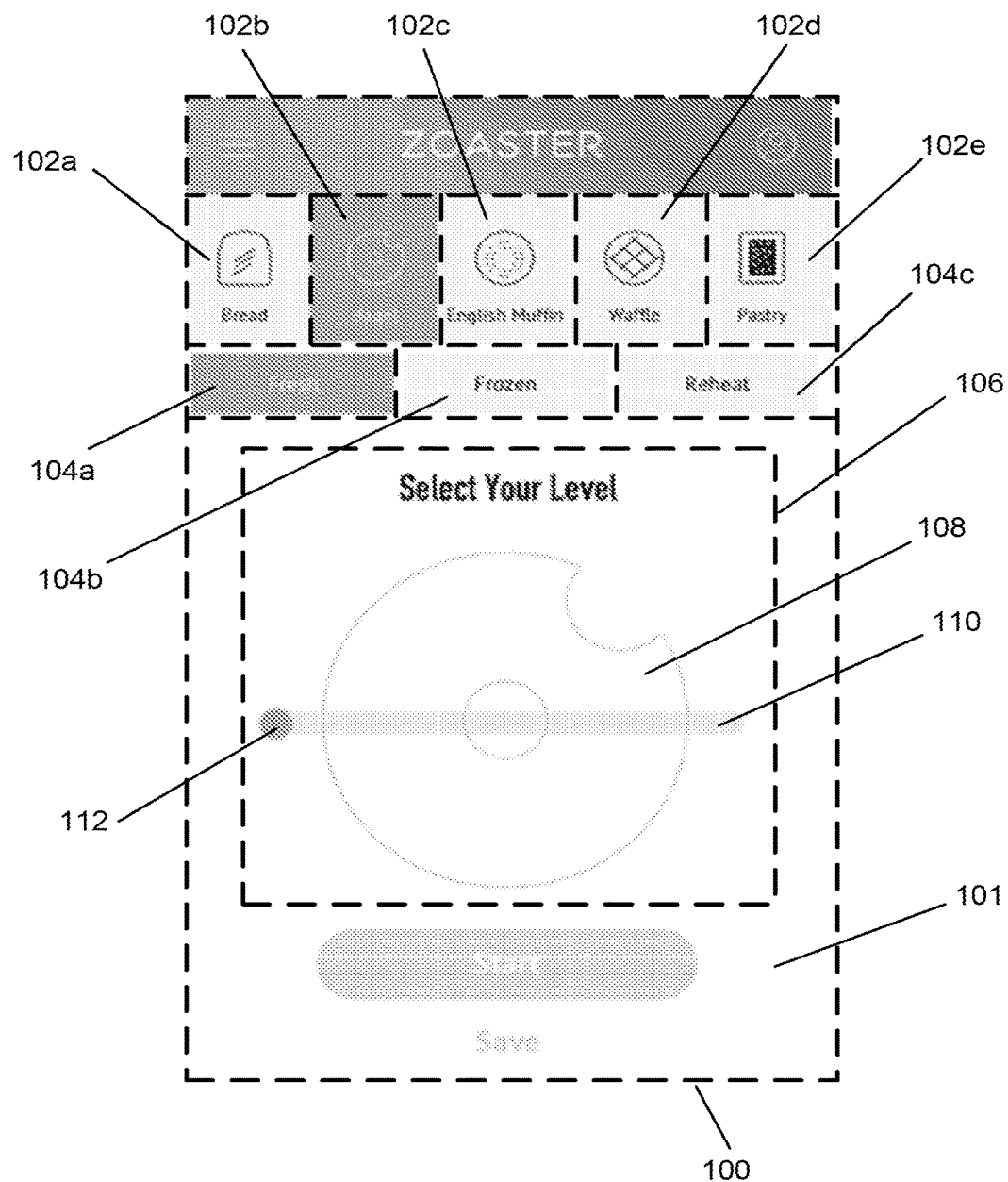
FIG. 3 is another view of the landing screen of the user interface.

FIG. 3 is another view of the landing screen 101 of the user interface 100. As shown in FIG. 3, the icon 102b representing a bagel is selected. In the example shown in FIG. 3, the background of the icon 102b changes color (e.g., from a clear color to an orange color) when selected, and simultaneously the background of the default icon 102a representing a slice of bread changes color (e.g., from an orange color to no color) when the icon 102b representing a bagel is selected on the landing screen 101.

As shown in FIGS. 2 and 3, the landing screen 101 includes a second set of icons 104a-104c that can be selected. Each of the second set of icons 104a-104c represents a cooking mode that determines the toasting and/or cooking algorithm performed by the toaster 10. For example, the icon 104a can represent a fresh cooking mode that has the function to toast and/or cook an ambient temperature food product that has not been previously toasted (e.g., a fresh slice of bread, a fresh bagel etc.). The icon 104b can represent a frozen and/or defrost cooking mode that has the function to thaw a frozen food product (e.g., a frozen bagel, a frozen waffle, etc.), melt the frost, and toast the food product to a selected doneness level. The icon 104c can represent a reheat cooking mode that has the function to warm a previously toasted or cooked food product with minimal increase to a selected doneness level. In certain examples, the icon 104a representing a fresh cooking mode is a default selection.

As shown in FIGS. 2 and 3, the background of the icons 104a-104c can change color (e.g., from a clear color to an orange color) when an icon is selected, and simultaneously the background of a previously selected icon (e.g., the default icon 104a representing a fresh cooking mode) can also change color (e.g., from an orange color to no color) when another icon 104a-104c is selected on the landing screen 101.

Figure 4:
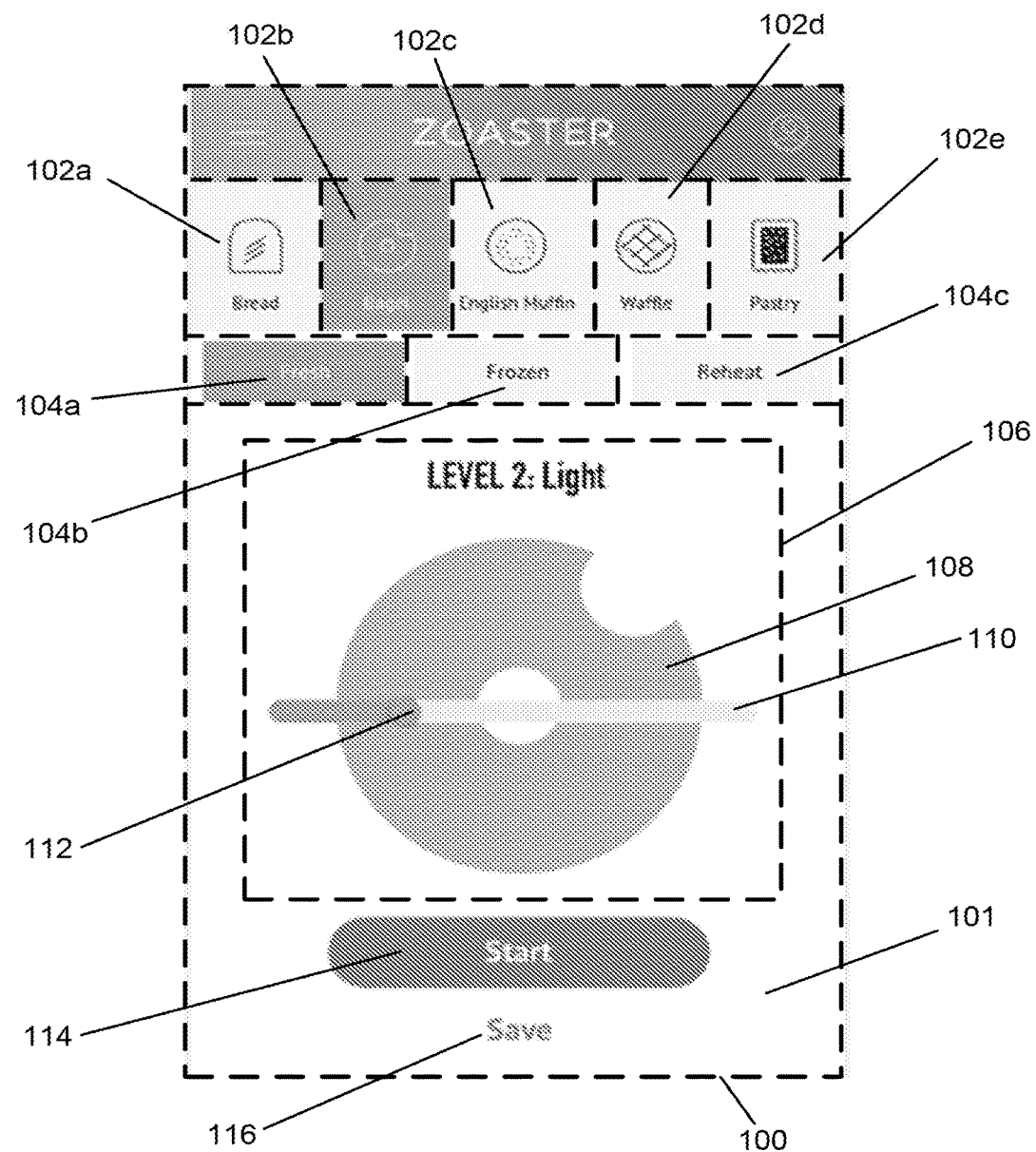
FIG. 4 is another view of the landing screen of the user interface.
Figure 5:
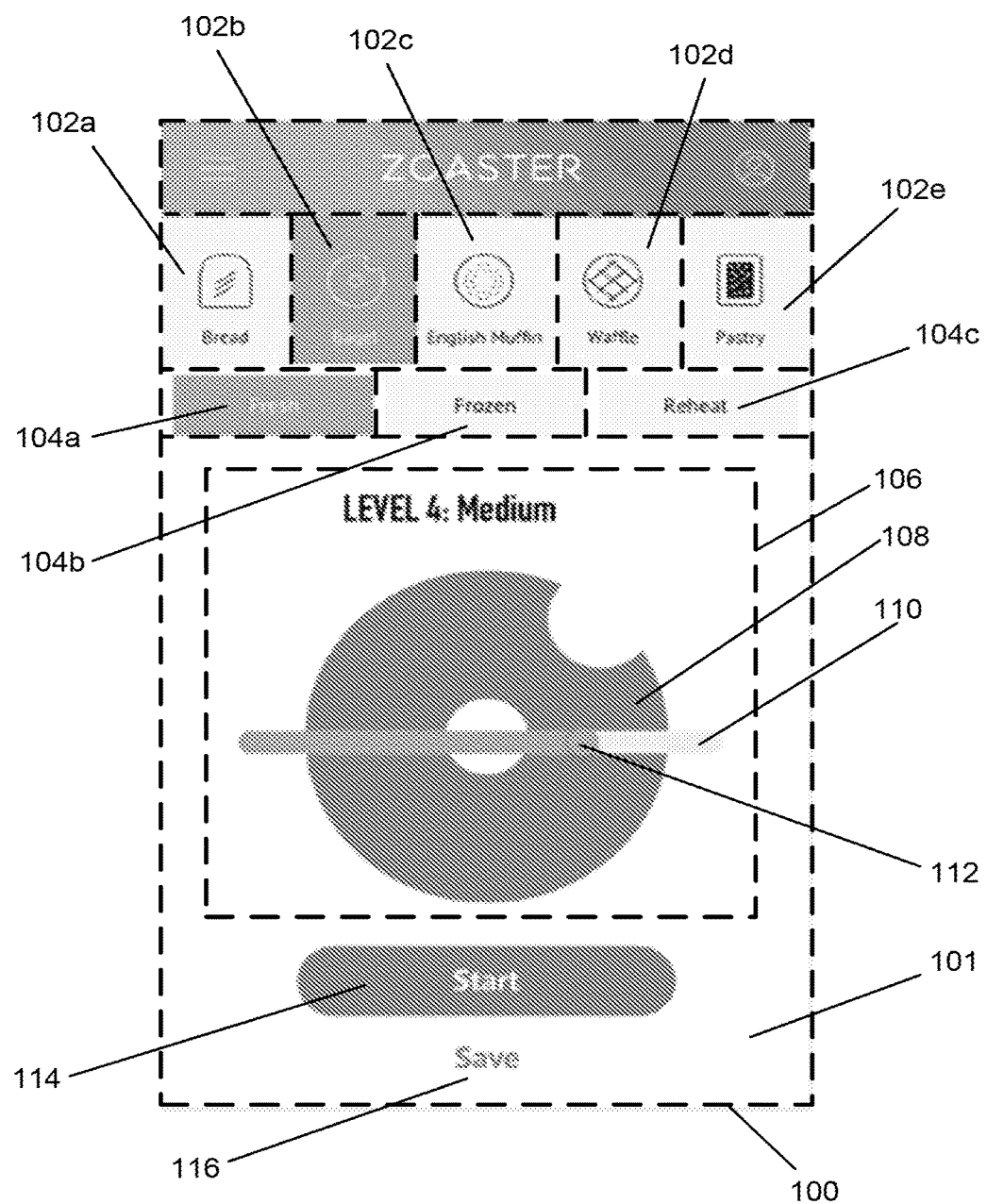
FIG. 5 is another view of the landing screen of the user interface.

FIGS. 4 and 5 are additional views of the landing screen 101. As shown in FIGS. 4 and 5, the landing screen 101 includes a doneness selector 106 that includes an image 108 of the food product selected from the second set of icons 104a-104c. In these examples, the icon 104b (e.g., representing a bagel) is selected, and accordingly the image 108 inside the doneness selector 106 is that of a bagel. In example of FIG. 2, the icon 104a (representing a slice of bread) is selected, and the image 108 inside the doneness selector 106 is that of a slice of bread. Thus, the image 108 inside the doneness selector 106 changes based on the selected food product.

Additionally, the doneness selector 106 includes a bar 110 with a pointer 112 that can be moved on the user interface 100 from left to right and from right to left to adjust a doneness level for the selected food product. For example, FIG. 4 shows the pointer 112 moved along the bar 110 to a doneness level 2 which represents a "Light" level of toasting. In contrast, FIG. 5 shows the pointer 112 moved along the bar 110 to a doneness level 4 which represents a "Medium" level of toasting. In this manner, a doneness level can be adjusted on the user interface 100 for the selected food product. In certain examples, there is no default doneness level, and rather, the doneness level must be selected by a user using the doneness selector 106.

FIG. 6 shows different shades of color, each shade of color representing a different doneness level ranging from a doneness level 1 to a doneness level 7. In the example shown in FIG. 6, the shade of color corresponding to doneness level 1 can correspond to an "Ultra-Light" doneness level; the shade of color corresponding to doneness level 2 can correspond to a "Light" doneness level; the shade of color corresponding to doneness level 3 can correspond to a "Medium Light" doneness level; the shade of color corresponding to doneness level 4 can correspond to a "Medium" doneness level; the shade of color corresponding to doneness level 5 can correspond to a "Medium Dark" doneness level; the shade of color corresponding to doneness level 6 can correspond to a "Dark" doneness level; and the shade of color corresponding to doneness level 7 can correspond to an "Ultra-Dark" doneness level. In some examples, the each doneness level corresponds to the AHAM T-1-2016 standard.

As shown in FIGS. 4 and 5, the shade of color of the image 108 inside the doneness selector 106 changes according to the doneness level selected by the pointer 112 that can be moved along the bar 110 by touching the user interface 100 and sliding the pointer 112 along the bar 110. As shown, the image 108 of the bagel in FIG. 4 has a lighter tone than the image 108 of the bagel in FIG. 5 because the pointer 112 in FIG. 4 selects a doneness level 2 whereas the pointer 112 in FIG. 5 selects a doneness level 4.

Accordingly, the user interface 100 with the doneness selector 106 visually depicts different shades of color that each represent a doneness level for toasting and/or cooking a food product by the toaster 10. By visually depicting each doneness level with a different shade of color, the toaster 10 is more effective at conveying doneness than a toaster that presents doneness levels with numerical values because the different shades of color displayed by the user interface 100 can be more easily understood by a user than a numerical value. This is especially true for first time users of the toaster 10 who are not familiar with the doneness levels of the toaster 10. Accordingly, the toaster 10 with user interface 100 and doneness selector 106 is more intuitive, and improves user experience over toasters that depict doneness levels with numerical values.

As shown in FIGS. 4 and 5, once the doneness level is selected using the doneness selector 106, the landing screen 101 displays a start icon 114 on the user interface 100. The start icon 114 can be selected to initiate a cooking cycle that causes the food product to be lowered inside a cooking cavity 14, and the heating elements to be energized for toasting and/or cooking the food product inside the cooking cavity 14. In some examples, the landing screen 101 can include a save icon 116 that can be selected to save the selected combination of food product, cooking mode, and doneness level to a user profile before the cooking cycle is initiated and/or after it is completed.

The cooking cycle can include a synchronized flow of steps such as (1) powering a lift to lower the food product into a DOWN position inside a cooking cavity 14; (2) displaying a cooking screen 118 (shown in FIG. 7A) on the user interface 100; (3) energizing the heating elements to perform a cooking algorithm; (4) displaying a countdown screen 119 (shown in FIG. 7B) on the user interface 100; (5) turning off the heating elements after the cooking algorithm is completed; (6) powering the lift to raise the food product into an UP position inside the cooking cavity 14; and (7) displaying a finished screen 122 (shown in FIG. 8) on the user interface 100 to indicate that the food product is ready to be removed from the toaster 10. In some examples, in addition to, or as an alternative to, displaying the finished screen 122, the cooking cycle can generate a sound to indicate that the food product is ready to be removed from the toaster 10.

The cooking algorithm performed by the heating elements inside the cooking cavity 14 is time-based with specific algorithms for each combination of (1) food product, (2) cooking mode, and (3) doneness level. The algorithm, in some embodiments, compensates for the internal temperature of the toaster 10 from prior toasting cycles (i.e., residual heat remaining in the chassis of the toaster 10 from prior toasting cycles). Additionally, in some embodiments, the algorithm compensates for a drop in line voltage caused, for example, when another appliance powered by the same electrical power circuit is powered on.

Figure 7A:
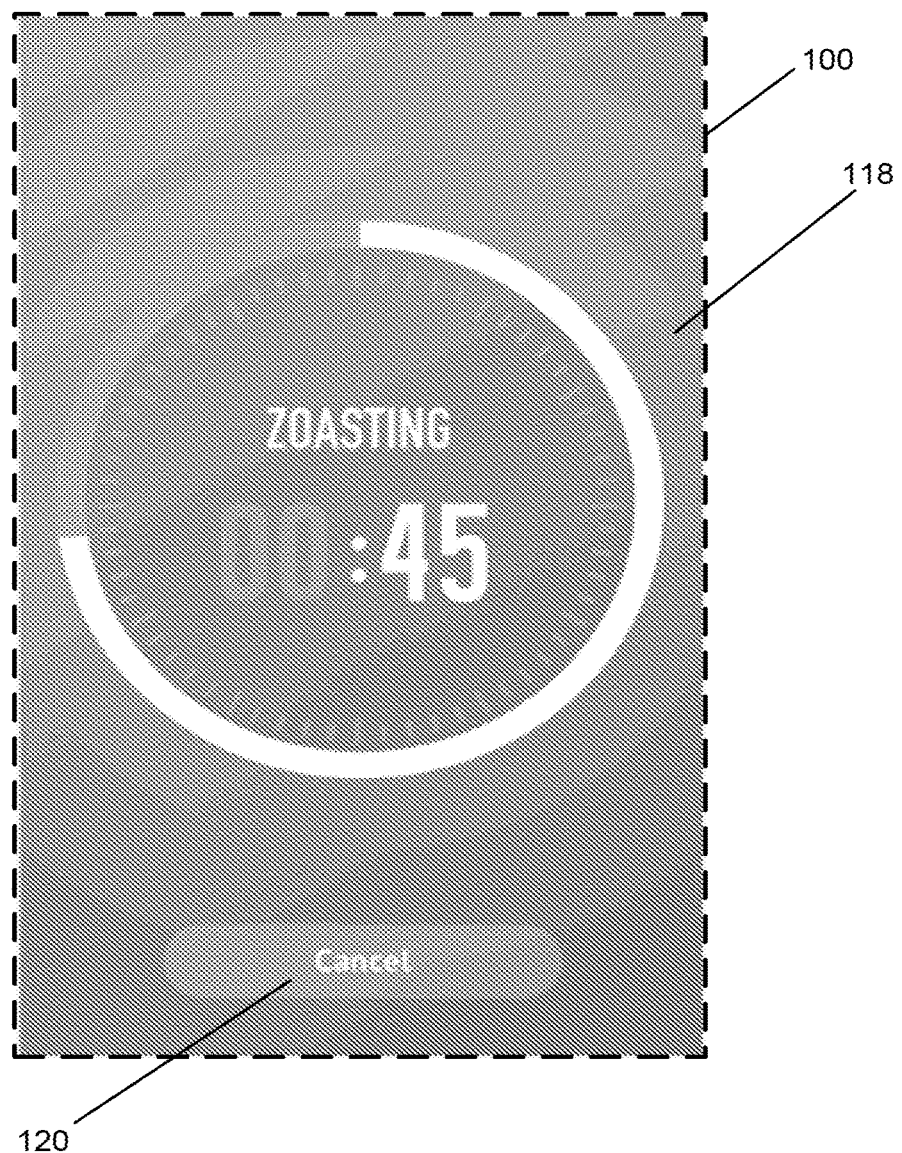
FIG. 7A is a view of the user interface displaying a cooking screen.

FIG. 7A is a view of the user interface 100 displaying the cooking screen 118. As shown in FIG. 7A, the cooking screen 118 can include a message (e.g., "Zoasting") which can indicate that the food product is currently being toasted and/or cooked by the toaster 10. It is noted that the message "Zoasting" displayed in FIG. 7A is only an illustrative example, and that the message on the cooking screen 118 can include any word or phrase to indicate the cooking, toasting, browning, or warming of a food product. For example, the cooking screen 118 may also display a message such as "Toasting" to indicate the process of rapidly browning the surface of a food product. In some examples, the cooking screen 118 includes a cancel icon 120 that can be selected to cancel the toasting and/or cooking of the food product before the time remaining for toasting and/or cooking the food product is completed.

Figure 7B:
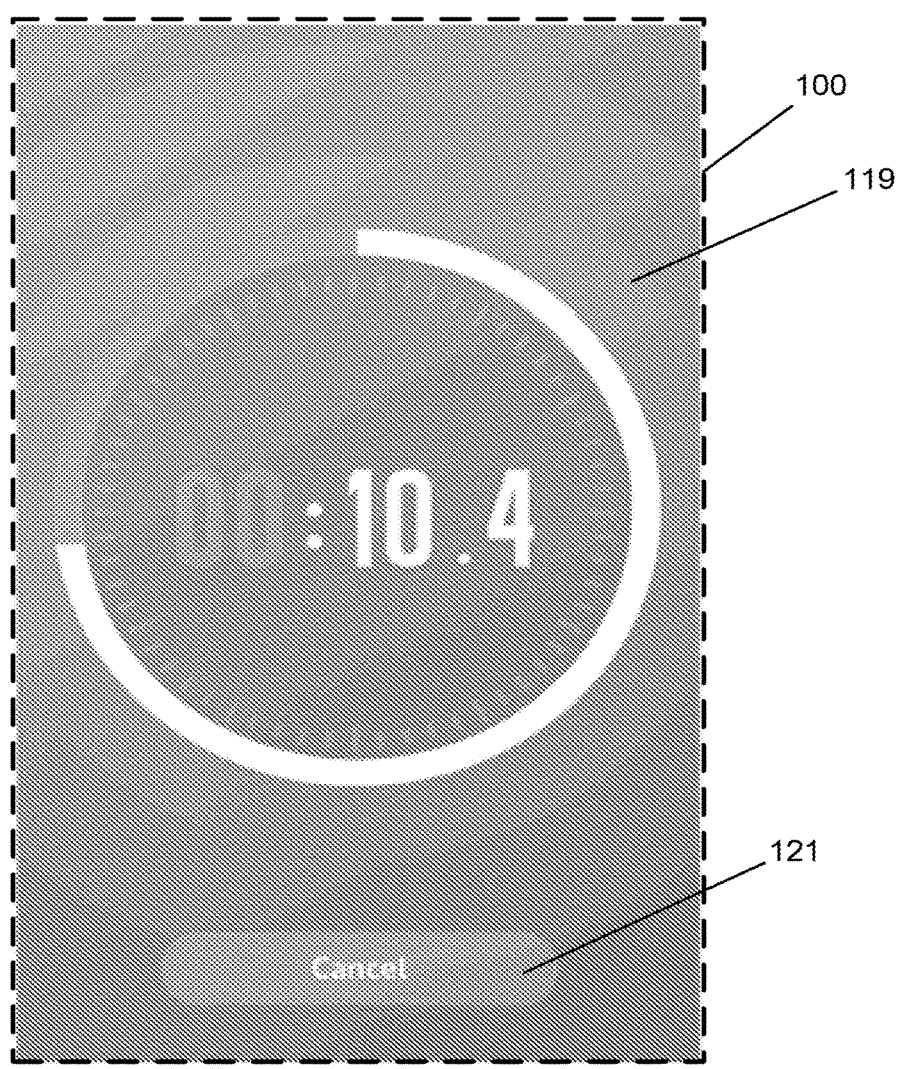
FIG. 7B is a view of the user interface displaying a countdown screen.

FIG. 7B is a view of the user interface 100 displaying the countdown screen 119. As shown in FIG. 7B, the countdown screen 119 shows the time remaining for toasting and/or cooking a food product. In some examples, the countdown screen 119 is shown on the user interface 100 only before a specified period of time (e.g., 10 seconds) is remaining for the toasting and/or cooking of the food product is to be completed. In some examples, the countdown screen 119 includes a cancel icon 121 that can be selected to cancel the toasting and/or cooking of the food product before the time remaining for toasting and/or cooking the food product is completed.

Figure 8:
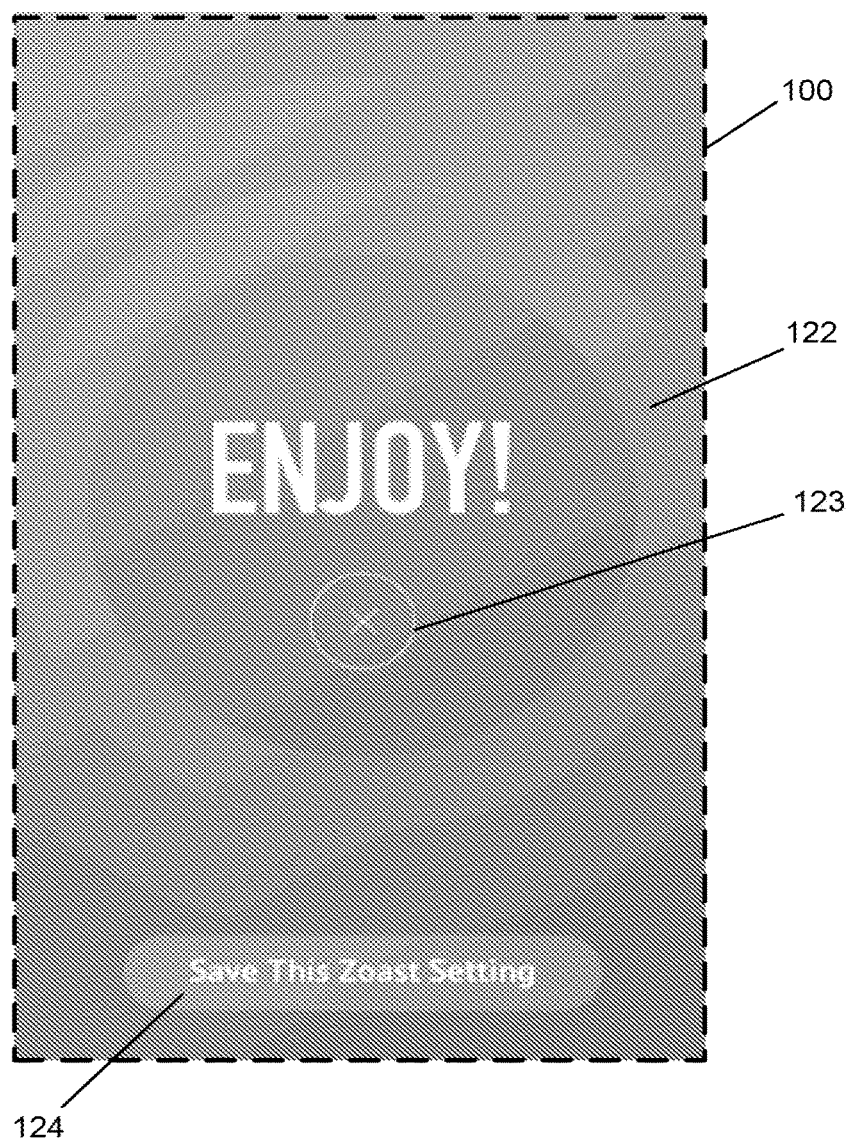
FIG. 8 is a view of the user interface displaying a finished screen.

FIG. 8 is a view of the user interface 100 displaying the finished screen 122 displayed after the toasting and/or cooking of the food product has been completed. As shown in FIG. 8, the finished screen 122 can include a message such as "Enjoy!". Additionally, the finished screen 122 can display a save icon 124 that can be used to save the selected combination of food product, cooking mode, and doneness level to a user profile after toasting and/or cooking has been completed.

Figure 9:
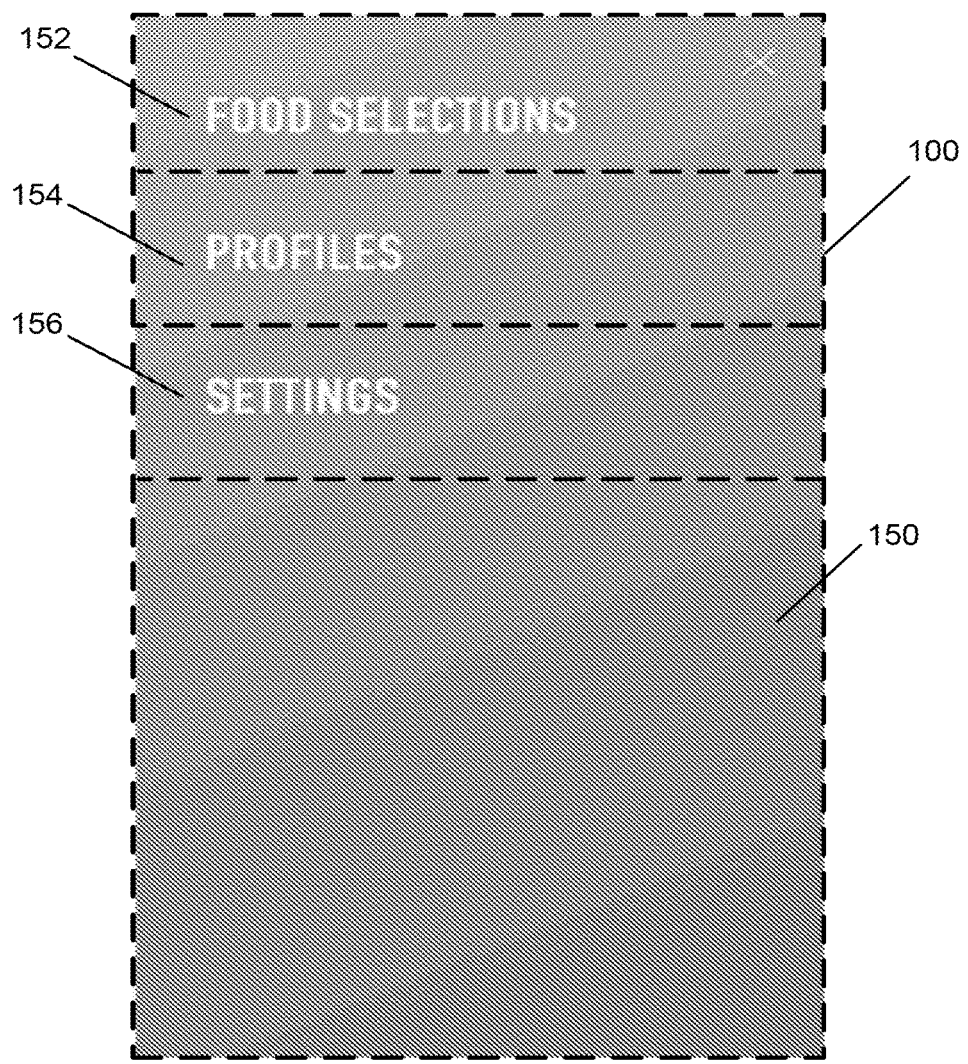
FIG. 9 is a view of the user interface displaying a menu screen.

FIG. 9 is a view of the user interface 100 displaying a menu screen 150. The menu screen 150 includes menu items such as "Food Selections" 152, "Profiles" 154, and "Settings" 156. Each item can be selected by a user by touching the touchscreen.

Figure 10:
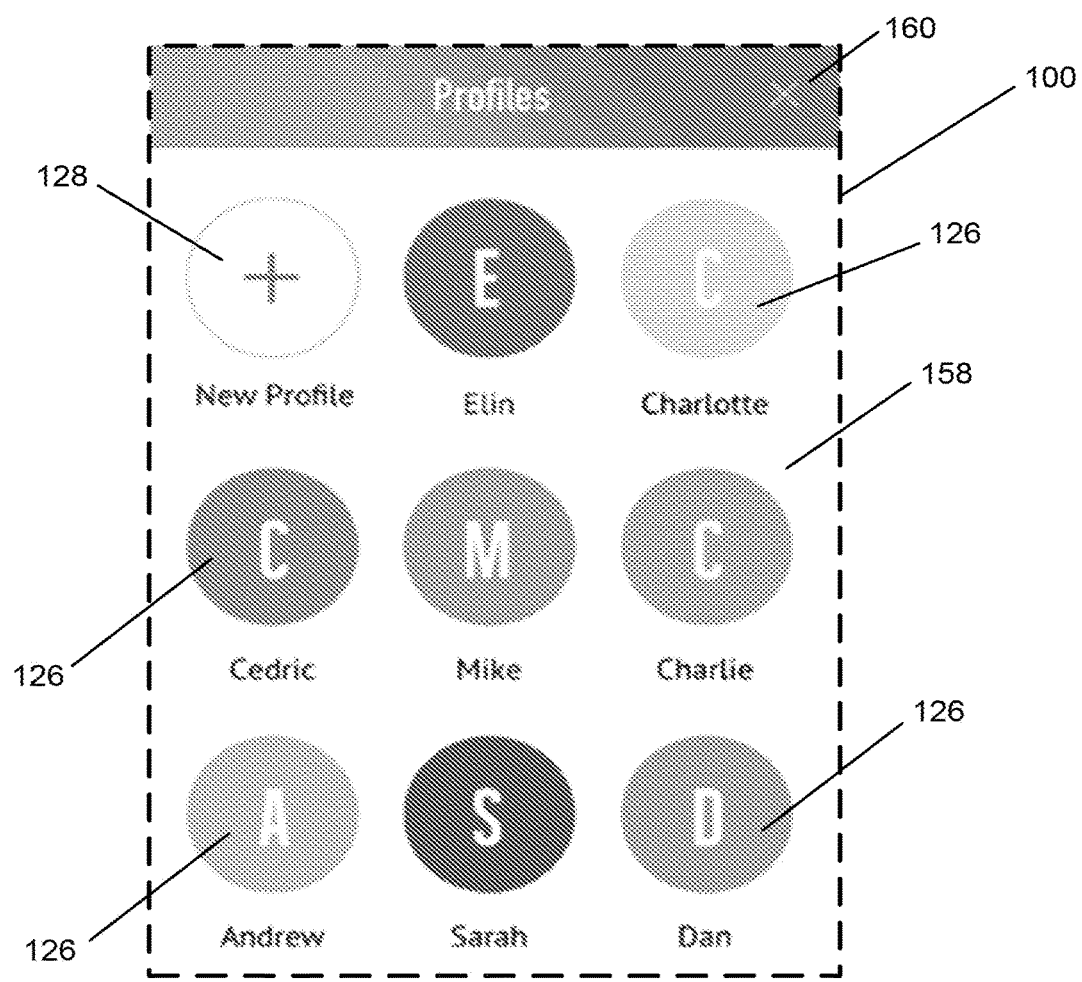
FIG. 10 is a view of the user interface displaying a profile home screen.

FIG. 10 is a view of the user interface 100 when the "Profiles" option 154 has been selected. As shown in FIG. 10, the user interface 100 can display a profile home screen 158 that includes multiple user profiles 126. Each user profile 126 can be depicted by a circular icon having a unique color and the first letter of a user's name. Multiple user profiles can be stored in the memory of the information processing system such that each member of a family in a household that uses the toaster 10 can have their own user profile. The profile home screen 158 can also include a new profile icon 128 that can be selected for creating a new user profile. As shown in FIG. 10, an icon 160 can be selected to return to the menu screen 150 (see FIG. 9).

Each user profile 126 can include multiple saved combinations of (1) food product, (2) cooking mode, and (3) doneness level. For example, a user can save a preferred combination to their user profile 126 for toasting bread during breakfast that includes (1) slice of bread 102a, (2) fresh cooking mode 104a, and (3) doneness level 4 for "Medium Dark" toasting. In another example, the same user can also save a preferred combination to their user profile 126 for toasting their favorite brand of frozen bagels that includes (1) bagel 102b, (2) frozen cooking mode 104b, and (3) doneness level 4 for "Medium Dark" toasting. Each combination that is saved to a user profile 126 can save time and convenience for the users of the toaster 10 who do not have to manually enter a new combination of (1) food product, (2) cooking mode, and (3) doneness level each time they use the toaster 10 to toast and/or cook a food product.

Figure 11:
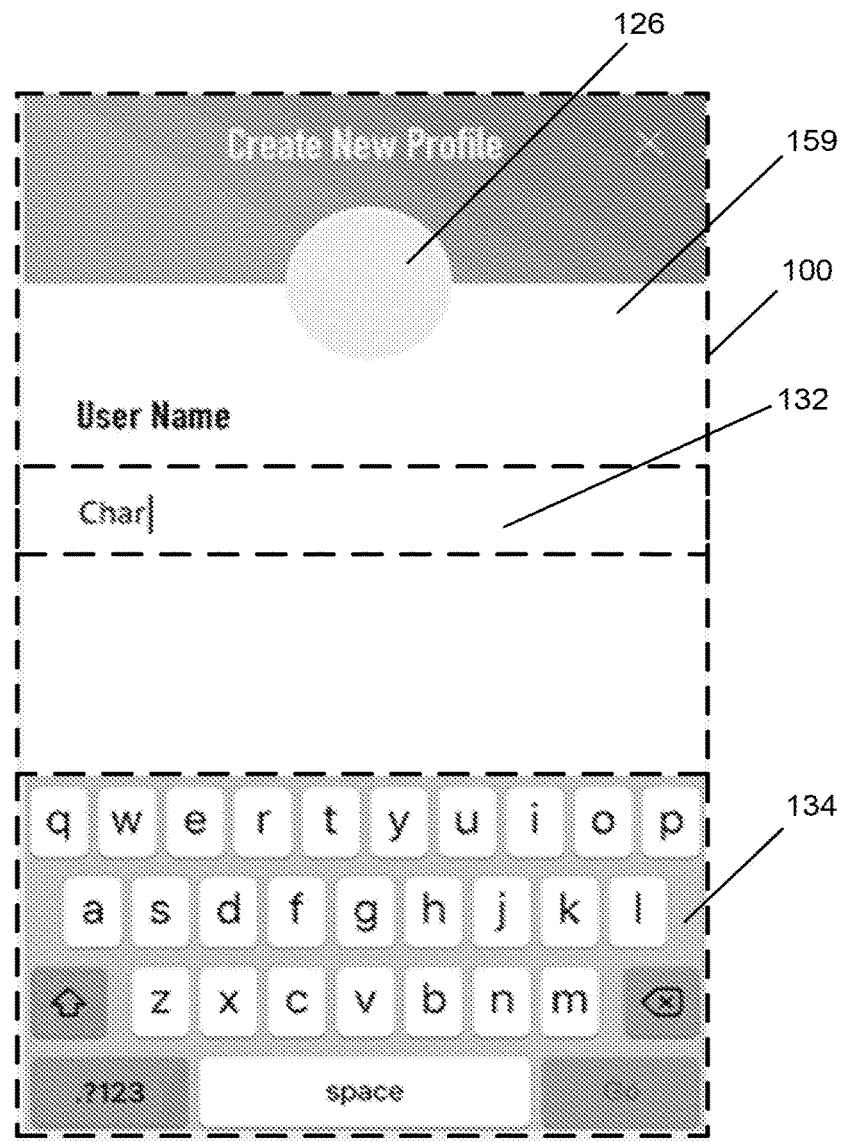
FIG. 11 is a view of the user interface displaying a new user profile screen.

FIG. 11 is a view of the user interface 100 displaying a new user profile screen 159. As shown in FIG. 11, the new user profile screen 159 includes a keyboard 134 that can be used to enter a user name in a field 132 to create a new user profile. The icon of the new user profile 126 is displayed on the new user profile screen 159 as an empty circle before the user name is entered into the field 132 using the keyboard 134.

Figure 12:
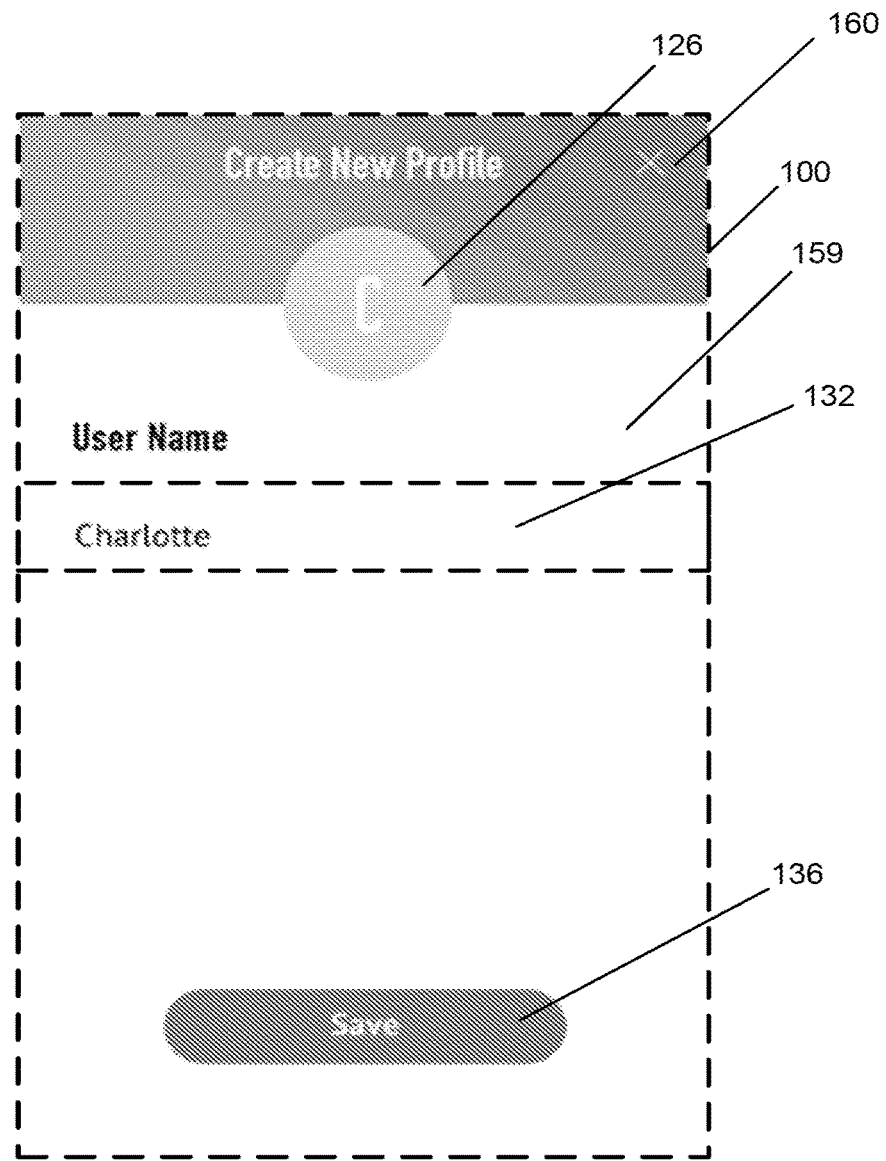
FIG. 12 is another view of the new user profile screen.

FIG. 12 is a view of the new user profile screen 159 after a new user name (e.g., "Charlotte") is entered in the field 132. As shown in FIG. 12, after the user name is entered into the field 132 using the keyboard 134, the new user profile screen 159 displays the icon 126 with the letter "C" inside in a colored (e.g., yellow) circle. The new user profile screen 159 includes a "Save" icon 136 that can be selected to save the new user profile. An icon 160 can be selected to cancel the creation of the new user profile 126, and to return to the menu screen 150.

Figure 13:
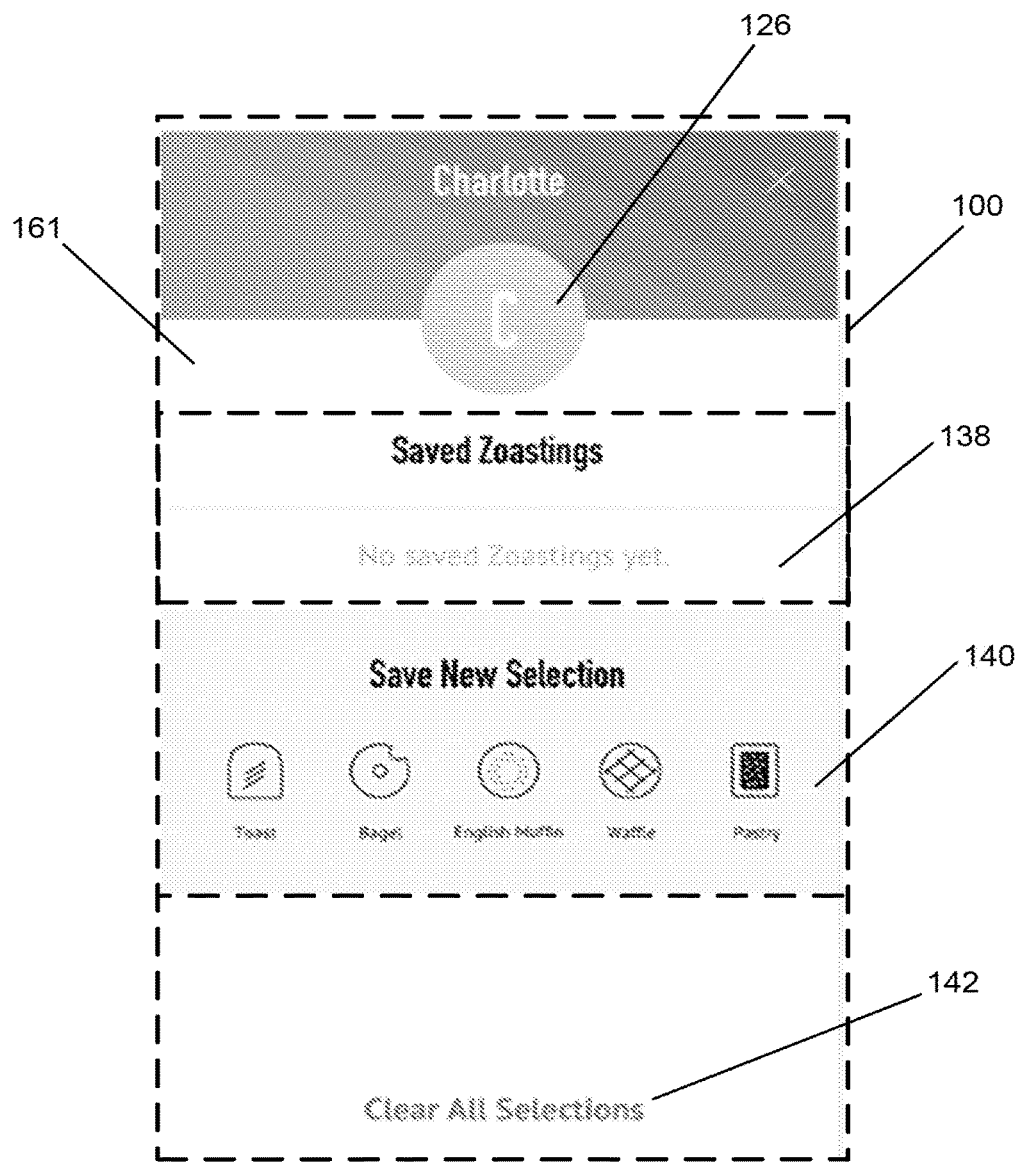
FIG. 13 is a view of the user interface displaying a user profile screen.

FIG. 13 is a view of the user interface 100 displaying a user profile screen 161. As shown in FIG. 13, the user profile screen 161 includes a saved toastings board 138 that displays saved combinations of (1) food product, (2) cooking mode, and (3) doneness level. In the example of FIG. 13, the saved toastings board 138 does not have any saved combinations. Instead, a message stating "No saved Zoastings yet" is displayed in the saved toastings board 138. It is noted that the phrase "Zoastings" is provided only as an illustrative example in the figures, and that the phrase "Zoastings" can be replaced by any word or phrase to indicate the cooking, toasting, browning, or warming of a food product.

As shown in FIG. 13, the user profile screen 161 includes a "Save New Selection" board 140 that can be used to create and save a new combination of (1) food product, (2) cooking mode, and (3) doneness level. Also, the user profile screen 161 includes a "Clear All Selections" icon 142 that can be selected to remove multiple saved combinations from the saved toastings board 138.

Figure 14:
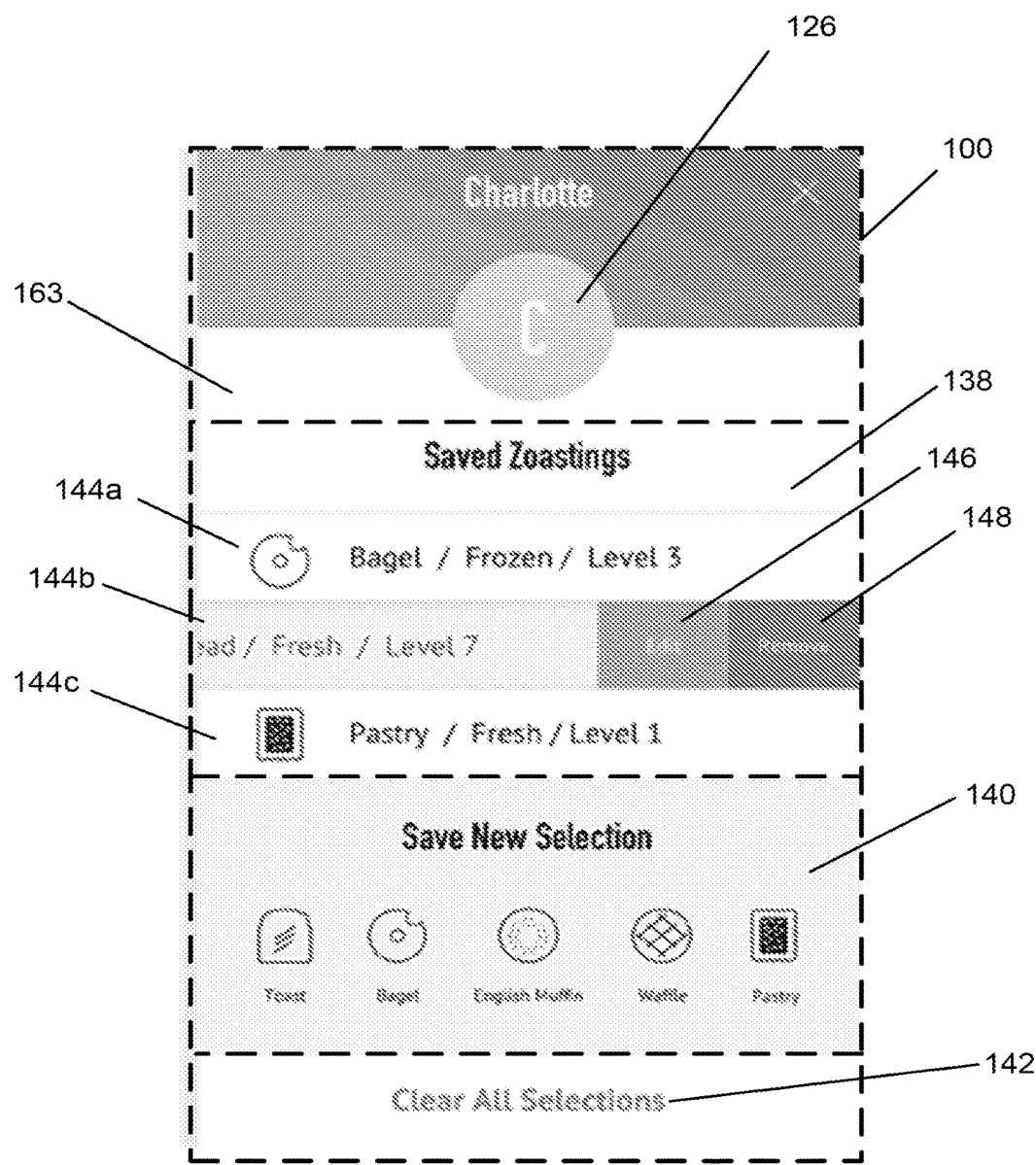
FIG. 14 is a view of the user interface displaying another user profile screen.

FIG. 14 is a view of a user profile screen 163 displayed by the user interface 100. The user profile screen 163 includes a saved toastings board 138 that includes several saved combinations of (1) food product, (2) cooking mode, and (3) doneness level. For example, a first displayed combination 144a includes (1) bagel, (2) frozen cooking mode, and (3) doneness level 3; a second displayed combination 144b includes (1) bread, (2) fresh cooking mode, and (3) doneness level 7; and a third displayed combination 144c includes (1) pastry, (2) fresh cooking mode, and (3) doneness level 1.

In the example of FIG. 14, the second displayed combination 144b is selected, and the user profile screen 161 provides a first option 146 to edit the saved combination, and a second option 148 to remove the saved combination.

Figure 15:
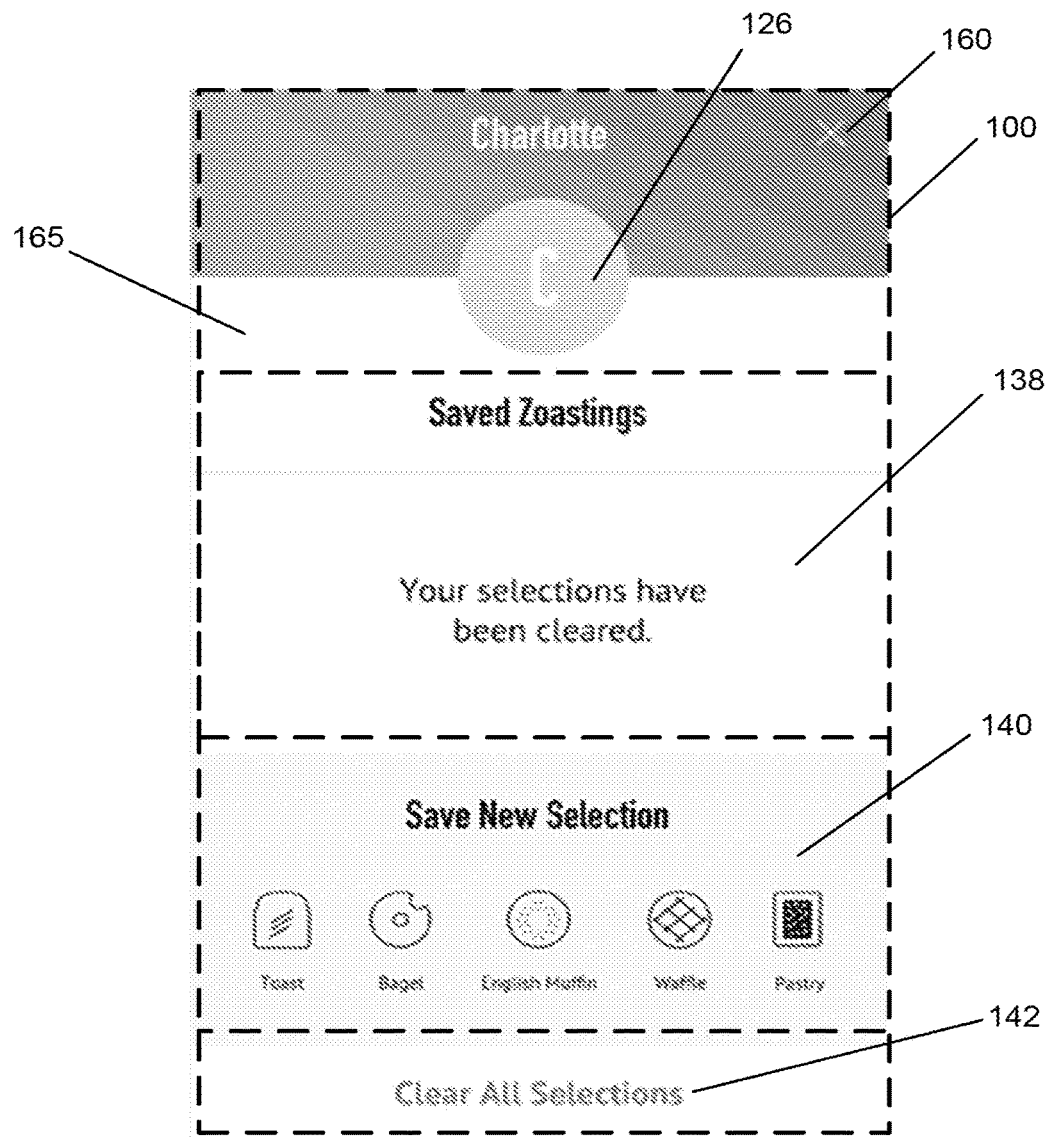
FIG. 15 is a view of the user interface displaying another user profile screen.

FIG. 15 is a view of the user interface 100 displaying another user profile screen 165. As shown in FIG. 15, the user profile screen 165 includes a message stating "Your selections have been cleared" in the saved toastings board 138. This message can be displayed after the "Clear All Selections" icon 142 is selected to remove selected combinations of (1) food product, (2) cooking mode, and (3) doneness level. As shown in FIG. 15, an icon 160 can be selected to return to the menu screen 150.

Figure 16:
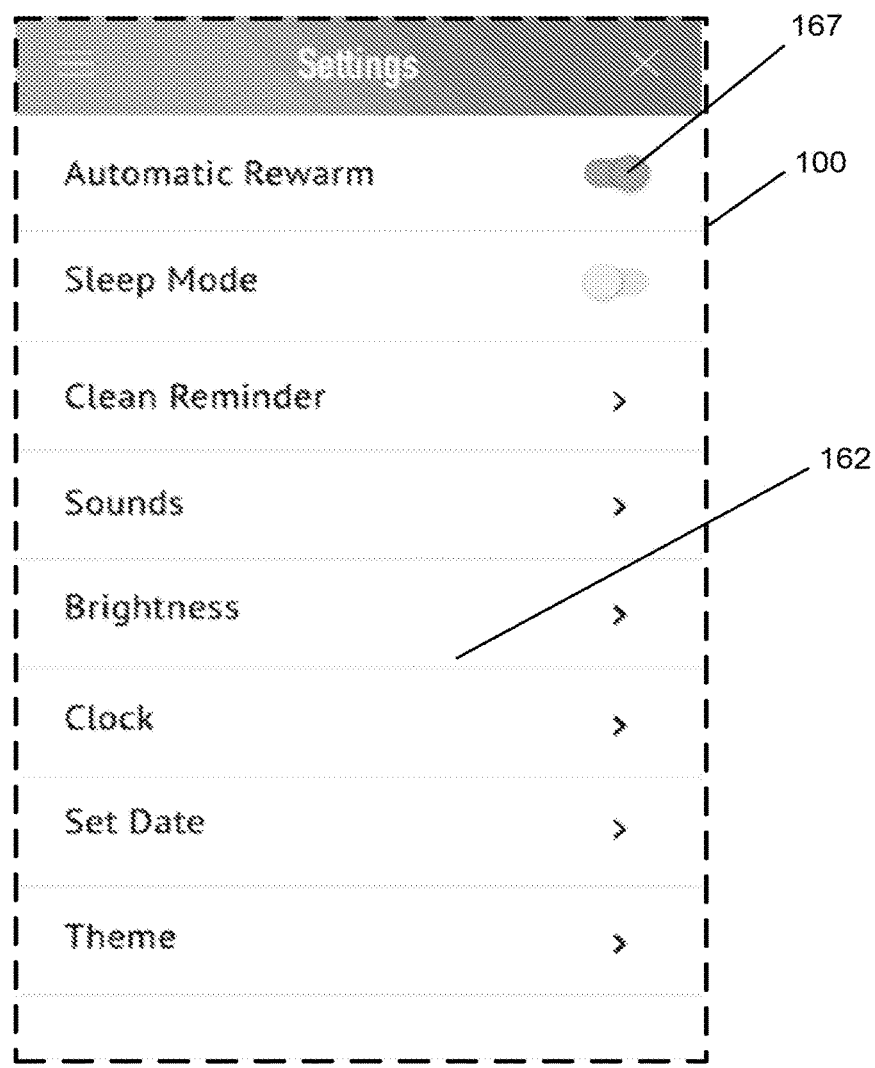
FIG. 16 is a view of the user interface of displaying a settings screen.

FIG. 16 is a view of the user interface 100 when the "Settings" option 156 has been selected from the menu screen 150 (shown in FIG. 9). As shown in FIG. 16, the user interface 100 displays a settings screen 162 where one or more setting can be adjusted by a user using the user interface 100. For example, settings such as an automatic rewarm feature, a sleep mode, a clean reminder, sounds, brightness, clock, date, and theme can each be adjusted using the settings screen 162 on the user interface 100.

As shown in FIG. 16, the settings screen 162 includes an automatic rewarm selector 167. The automatic rewarm selector 167 can be used to enable or disable an automatic rewarm feature. When enabled, the automatic rewarm feature rewarms a food product for a predetermined amount of time after the cooking cycle has ended.

Referring back to FIG. 8, the finished screen 122 includes a clear icon 123 that can be selected to indicate that the food product has been removed from the toaster 10. When the automatic rewarm feature is enabled, the toaster 10 will determine whether the clear icon 123 has been selected within a predetermined amount of time (e.g., 30 seconds). When the toaster 10 detects that the clear icon has not been selected within the predetermined amount of time, the toaster 10 will initiate a rewarming cycle.

The rewarming cycle can include a synchronized flow of steps such as (1) powering the lift to lower the food product back into the DOWN position inside the cooking cavity 14; (2) displaying the cooking screen 118 on the user interface 100; (3) reenergizing the heating elements to perform a rewarming algorithm; (4) displaying the countdown screen 119 on the user interface 100; (5) turning off the heating elements after a predetermined amount of time; (6) powering the lift to raise the food product into the UP position; and (7) displaying the finished screen 122 on the user interface 100 (and in certain examples, in addition to, or as an alternative to, displaying the finished screen 122, generating a sound to indicate that the food product is ready).

In some examples, the rewarming algorithm includes reenergizing the inner and outer heating elements of the cooking cavities 14 at a 50% duty cycle for 10 seconds, and then de-energizing the inner and outer heating elements 10 seconds. The reenergizing and de-energizing of the heating elements may alternately take place during the predetermined amount of time. In some examples, the predetermined amount of time that the heating elements are reenergized during the rewarming cycle can be in a range from 10 to 40 seconds. In certain examples, the predetermined amount of time that the heating elements are reenergized during the rewarming cycle can be 30 seconds.

The toaster 10 can enter an idle mode after a certain period of time has passed after any toaster activity or after power has been applied to the toaster (if the user has not interacted with the toaster). In some examples, the toaster 10 enters the idle mode after 60 seconds. During the idle mode, the user interface 100 can be in a clock mode or a sleep mode. The clock mode or the sleep mode can be selected by a user on the settings screen of the user interface 100. When the clock mode is enabled by the user, the sleep mode is disabled on the user interface 100.

Figure 17:
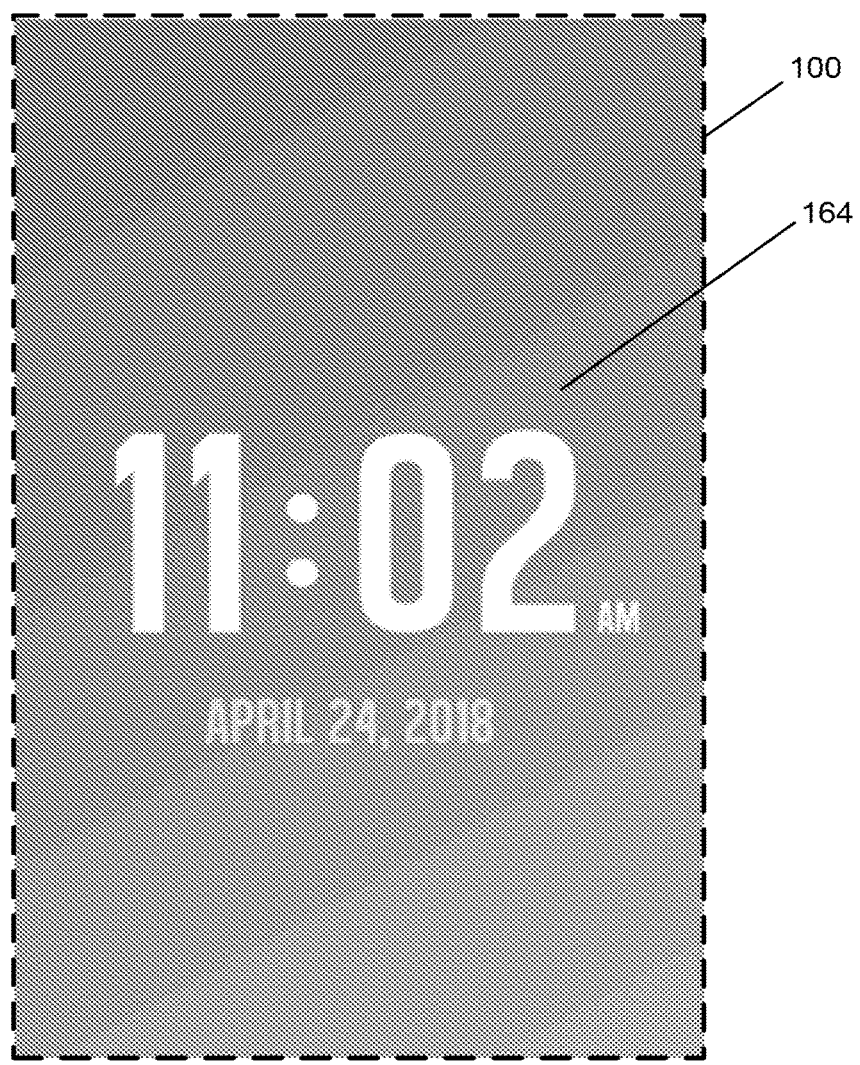
FIG. 17 is a view of the user interface of displaying a clock screen.

FIG. 17 is a view of the user interface 100 during the clock mode. As shown in FIG. 17, the user interface 100 displays a clock screen 164 showing the time and optionally the date. The clock screen 164 is displayed by the user interface 100 while the toaster 10 remains in the idle mode (i.e., until the user presses anywhere on the clock screen 164). When a user presses the clock screen 164, the user interface 100 exits the idle mode and displays the landing screen shown in FIG. 2. In some examples, the clock screen displays "00:00" as a default when a user has not set the time. In some examples, the date is blank on the clock screen as a default when the user has not set the date or when a show date setting is disabled on the user interface 100.

Figure 18:
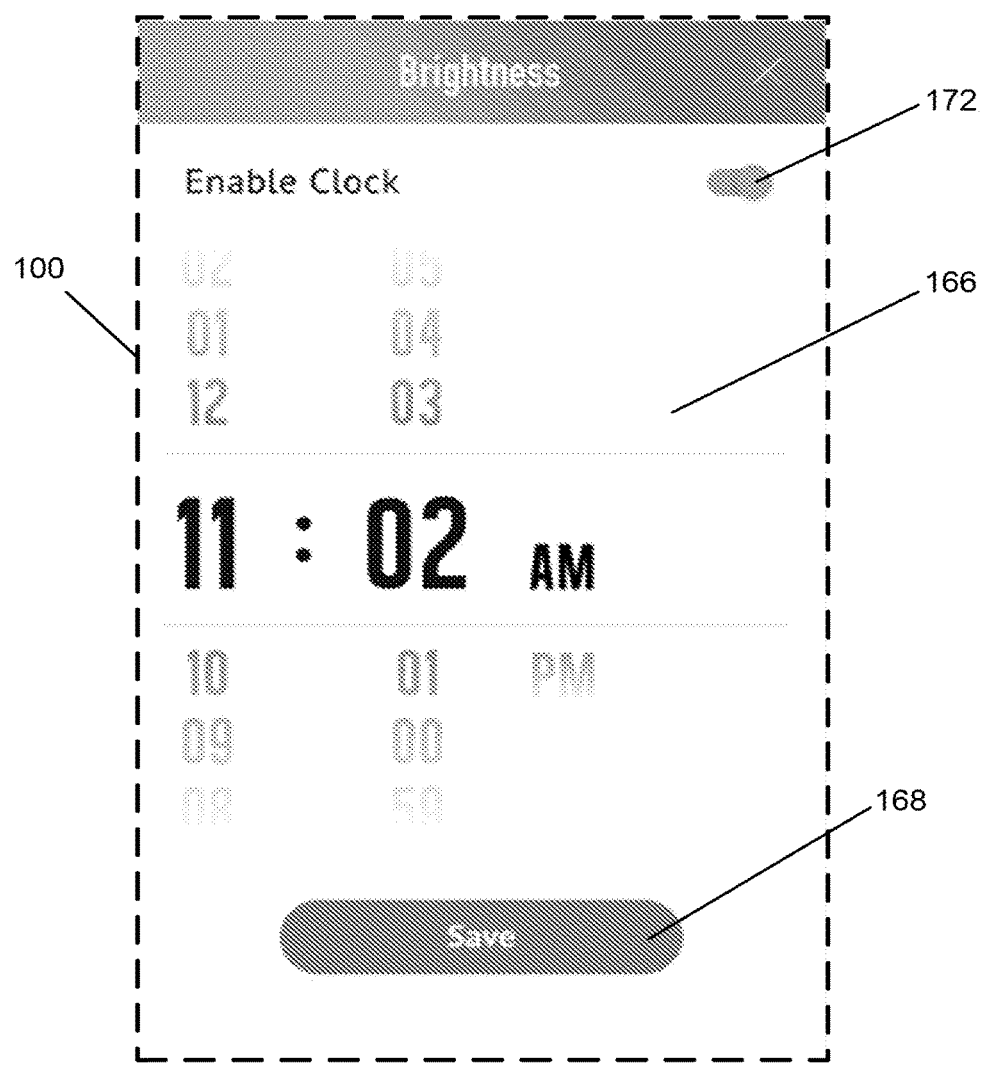
FIG. 18 is a view of the user interface of displaying a clock adjustment screen.

FIG. 18 is a view of the user interface 100 displaying a clock adjustment screen 166. As shown in FIG. 18, the clock adjustment screen 166 can be used by a user to adjust and/or set the time displayed on clock screen 164 during the clock mode. The clock adjustment screen 166 can include a save icon 168 to save the set time. The clock adjustment screen 166 can also include an enablement icon 172 that can be used to enable or disable the clock mode. As described above, when the clock mode is enabled by the user, the sleep mode is disabled on the user interface 100.

Figure 19:
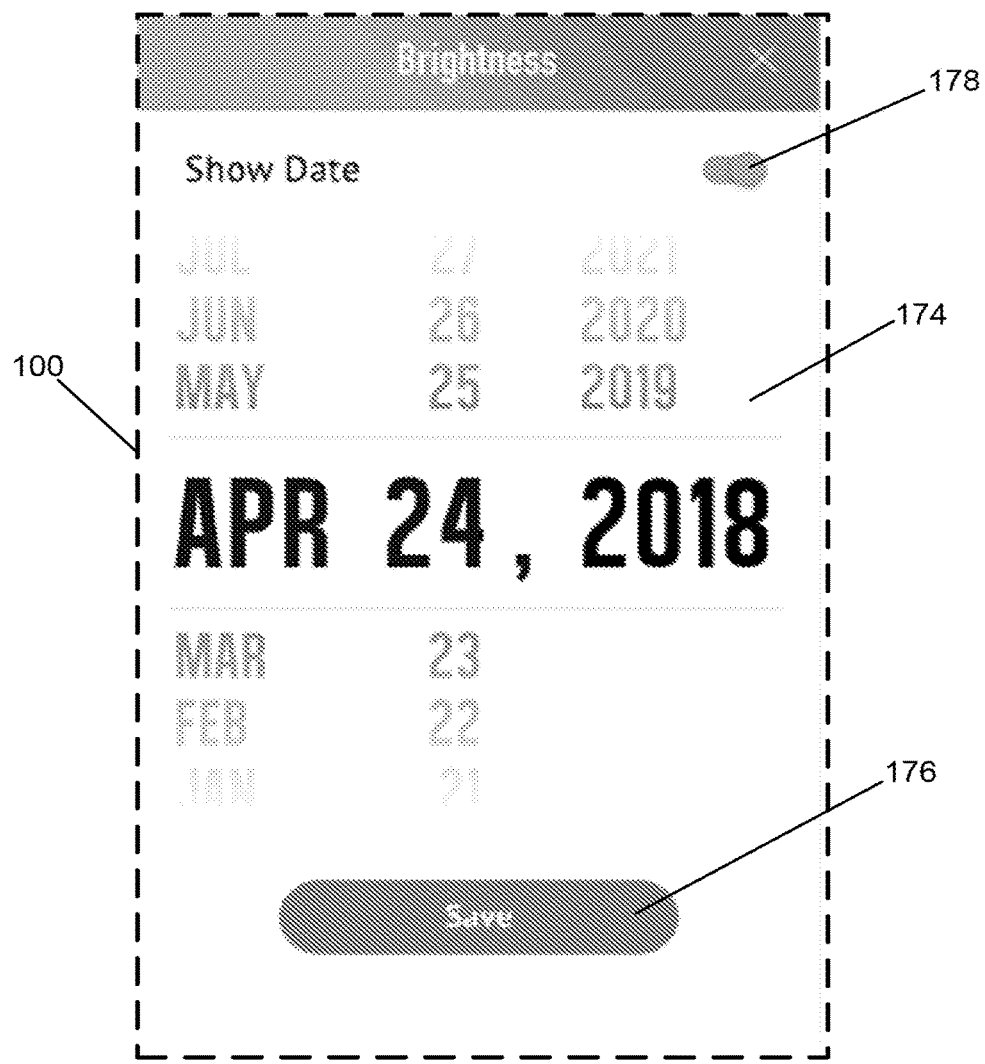
FIG. 19 is a view of the user interface displaying a date adjustment screen.

FIG. 19 is a view of the user interface 100 displaying a date adjustment screen 174. As shown in FIG. 19, the date adjustment screen 174 can be used by a user to adjust and/or set the date displayed on clock screen 164 during the clock mode. The date adjustment screen 174 can include a save icon 176 to save the set date. The date adjustment screen 174 can also include a show date icon 178 that can be used to display or hide the date on the clock screen 164 and when the clock mode is enabled.

Figure 20:
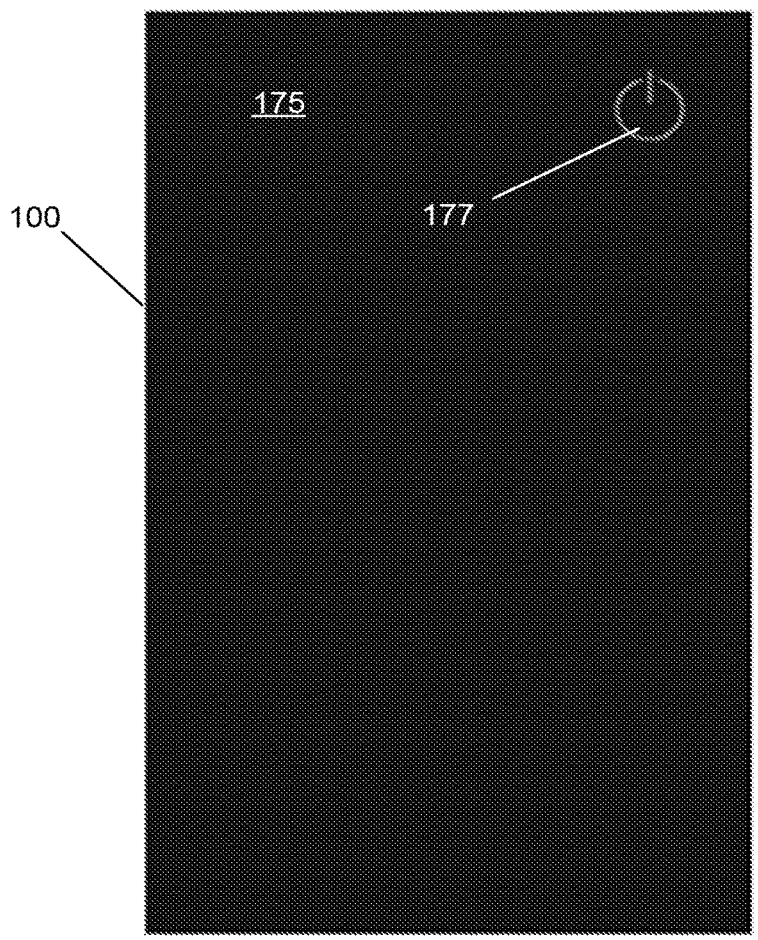
FIG. 20 is a view of the user interface displaying a sleep mode screen.

FIG. 20 is a view of the user interface 100 displaying a sleep mode screen 175. When the sleep mode is enabled (e.g., the clock mode is disabled), the user interface 100 displays the sleep mode screen 175 while the toaster 10 is in the idle mode. As shown in FIG. 20, the sleep mode screen 175 can be blank screen with a power icon 177. The user interface 100 displays the sleep mode screen 175 until the power icon 177 is selected by a user. After the power icon 177 is selected by the user, the user interface 100 can display the landing screen of FIG. 2.

Figure 21:
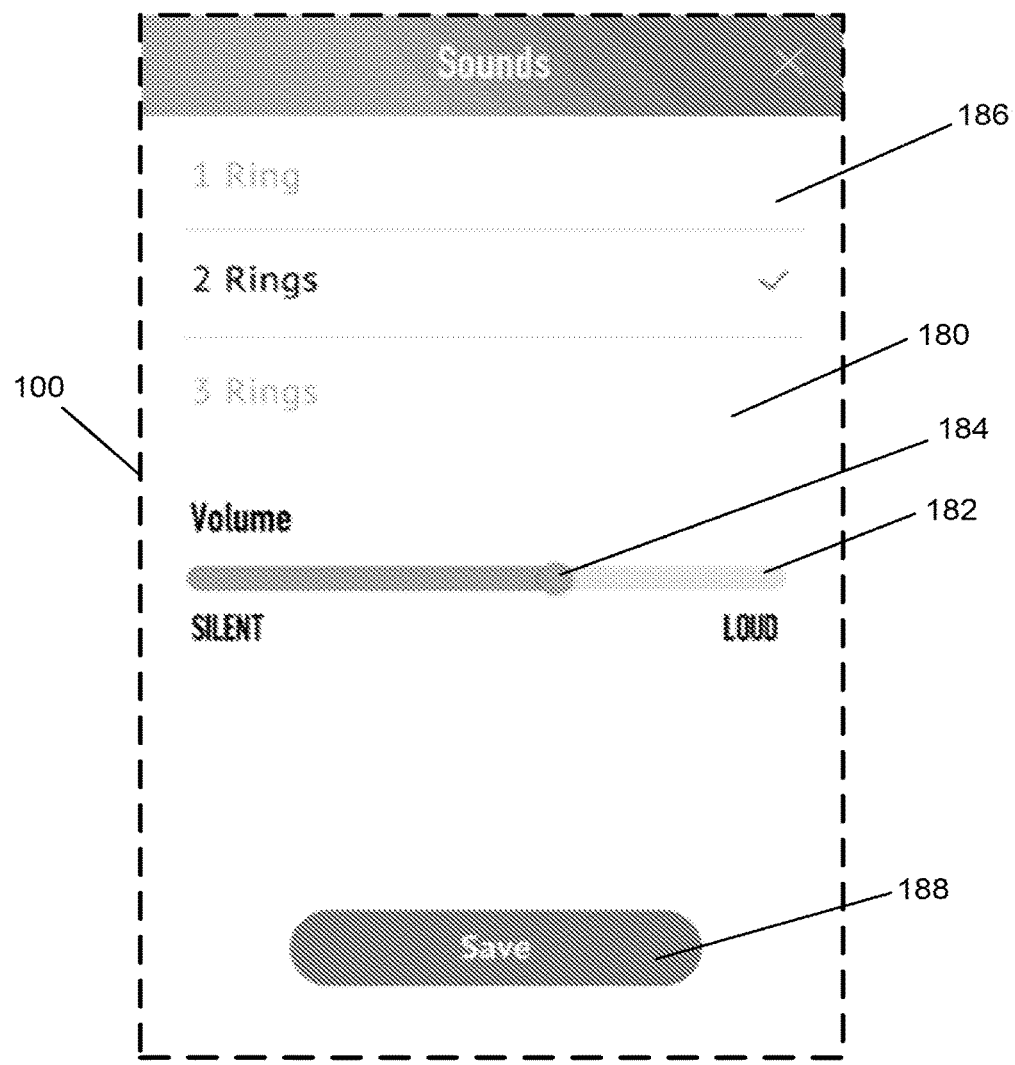
FIG. 21 is a view of the user interface displaying a sound adjustment screen.

FIG. 21 is a view of the user interface 100 displaying a sound adjustment screen 180. As noted above, in some examples, in addition to, or as an alternative to, displaying the finished screen 122 (see FIG. 8), the toaster 10 can also generate a sound such a ring or a beep when the toasting and/or cooking of a food product is finished. As shown in FIG. 20, the sound adjustment screen 180 includes a pointer 184 that can be moved from the left (e.g., "silent") to the right (e.g., "loud") along a bar 182 to increase the volume of the sound generated by the toaster 10, and the pointer 184 can be moved from the right (e.g., "loud") to the left (e.g., "silent") along the bar 182 to decrease the sound generated by the toaster 10 until there is no sound generated (i.e., the toaster 10 is "silent"). Also, the sound adjustment screen 180 can include a menu 186 that allows a user to select 1 ring, 2 rings, or 3 rings when the food product is ready. In some examples, a one second interval occurs between each ring when the food product is ready. The sound adjustment screen 180 includes a save icon 188 that can be selected to save the adjusted volume and the selected number of rings.

Figure 22:
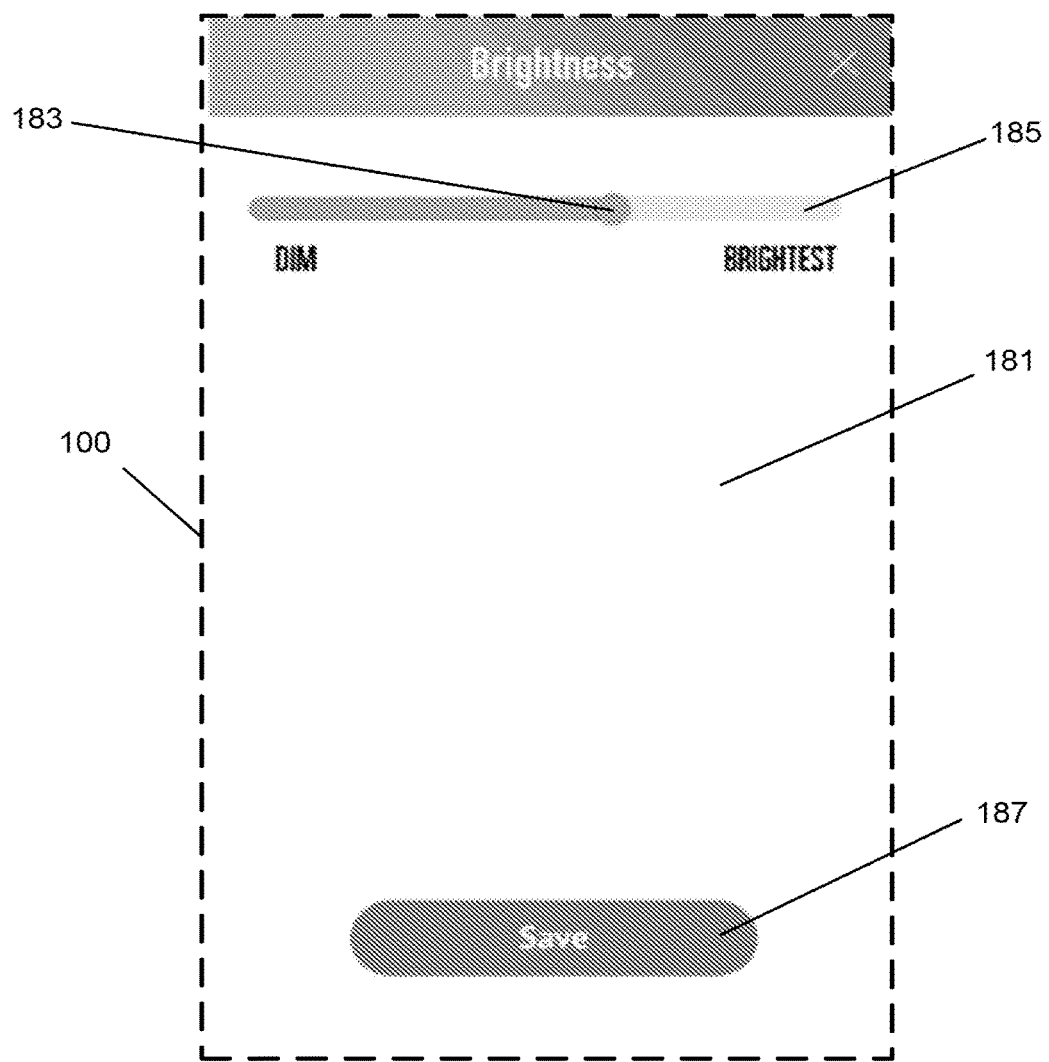
FIG. 22 is a view of the user interface displaying a brightness adjustment screen.

FIG. 22 is a view of the user interface 100 displaying a brightness adjustment screen 181. As shown in FIG. 22, the brightness adjustment screen 181 includes a pointer 183 that can be moved from the left (e.g., "dim") to the right (e.g., "brightest") along a bar 185 to increase the brightness of the user interface 100, and the pointer 183 can be moved from the right (e.g., "brightest") to the left (e.g., "dim") along the bar 185 to decrease the brightness of the user interface 100. Decreasing the brightness of the user interface 100 can result in energy savings, whereas increasing the brightness can improve the visibility of the user interface 100. The brightness adjustment screen 181 further includes a save icon 187 that can be selected to save the adjusted brightness.

Figure 23:
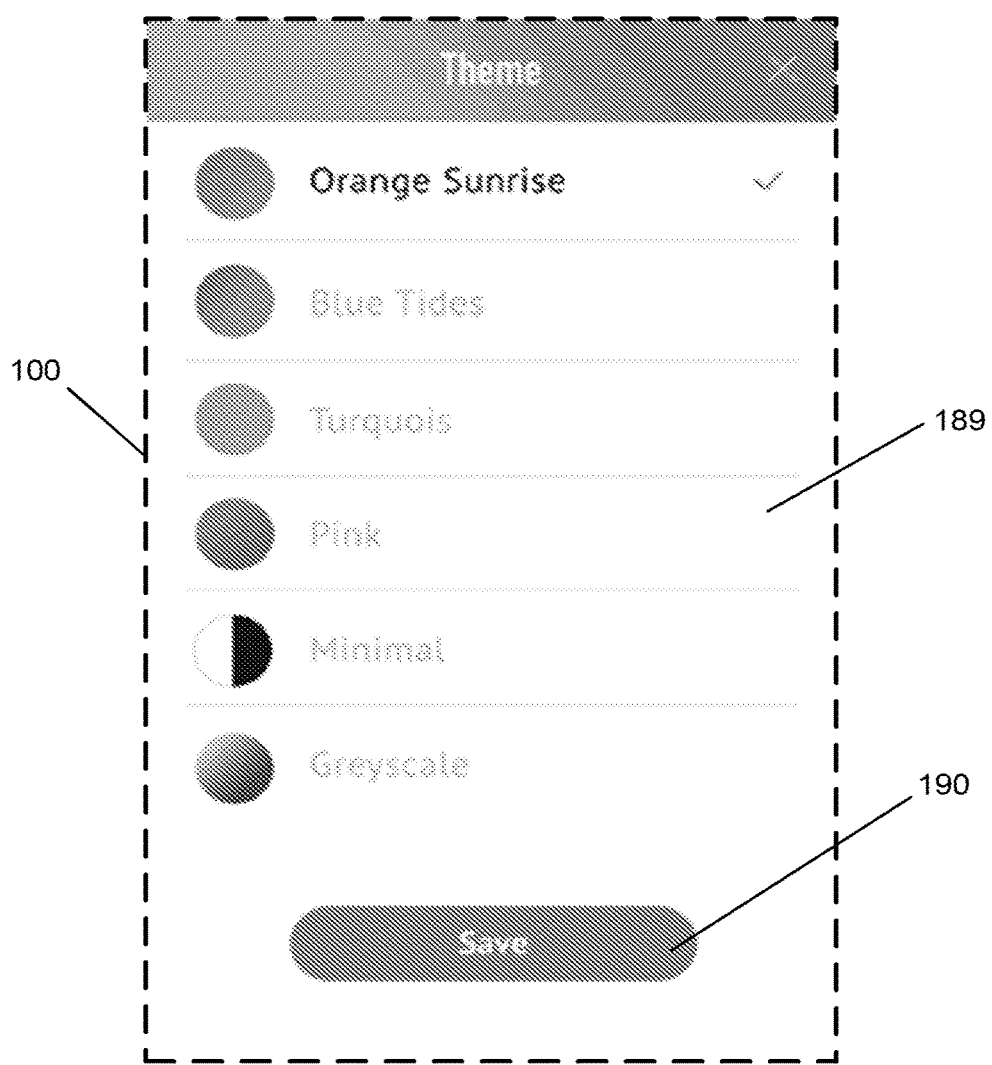
FIG. 23 is a view of the user interface displaying a theme adjustment screen.

FIG. 23 is a view of the user interface 100 displaying a theme adjustment screen 189. As shown in FIG. 23, the theme adjustment screen 189 includes one or more themes that can be selected for the user interface 100. Each theme can adjust the appearance the user interface 100 and the various screens included therein such as by changing the color, layout, shapes etc. of the various screens. In the example shown in FIG. 23, the theme adjustment screen 189 includes themes such as "Orange Sunrise", "Blue Tides", "Turquois", "Pink", "Minimal", and "Greyscale." As shown in FIG. 23, the "Orange Sunrise" theme is selected. The theme adjustment screen 189 includes a save icon 190 that can be selected to save the selected theme.

Figures 24, 25:
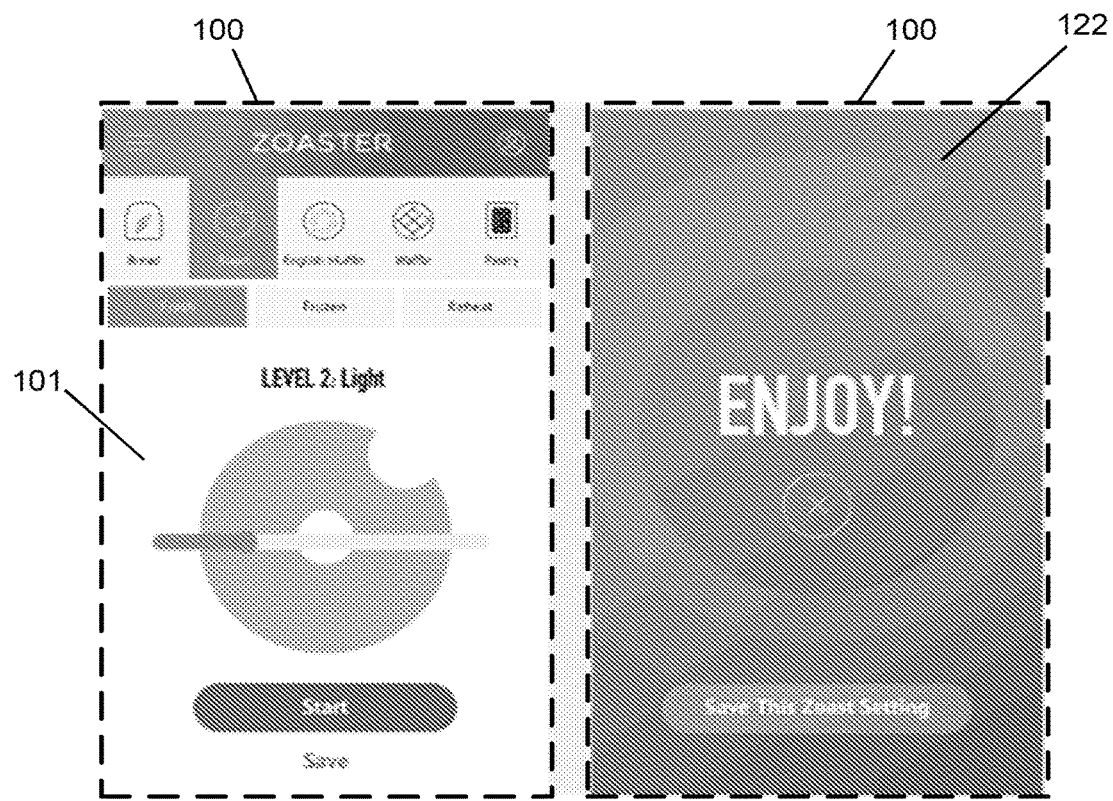
FIG. 24 is a view of the user interface displaying a different theme.
FIG. 25 is another view of the user interface displaying a different theme.

FIGS. 24 and 25 are views of different screens of the user interface 100 that display a different theme than the theme of the user interface shown in FIG. 2. In the example of FIG. 24, the landing screen 101 is shown in the "Blue Tides" theme. In the example of FIG. 25, the finished screen 122 is shown in the "Blue Tides" theme.

Figure 26:
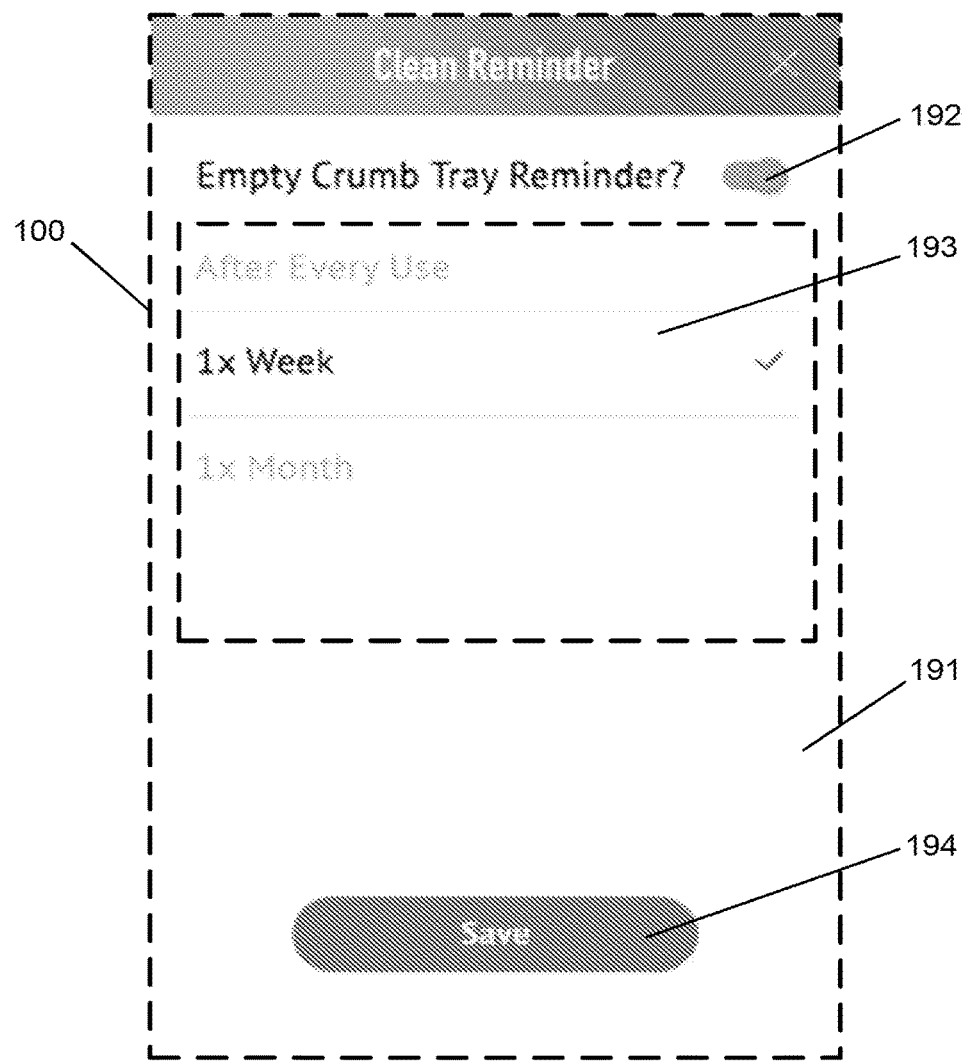
FIG. 26 is a view of the user interface displaying a clean crumb tray reminder adjustment screen.

FIG. 26 is a view of the user interface 100 displaying a clean crumb tray reminder adjustment screen 191. In some examples, the toaster 10 can include a clean crumb tray reminder feature that displays a reminder on the user interface 100 to empty the crumb tray of the toaster 10 after a predetermined number of toasting cycles.

As shown in FIG. 26, the clean crumb tray reminder adjustment screen 191 includes an selector icon 192 to select (e.g., enable) the clean crumb tray reminder feature or to disable the clean crumb tray reminder feature. The clean crumb tray reminder adjustment screen 191 also includes a menu 193 that displays one or more options for selecting a frequency for the clean crumb tray reminder. For example, the menu 193 can include options such as a reminder after every use, a reminder one time per week, or a reminder one time per month. In the example shown in FIG. 26, the option for a reminder for one time per week is selected. The clean crumb tray reminder adjustment screen 191 further includes a save icon 194 that can be selected to save the selected settings for the clean crumb tray reminder feature.

Although the options in the menu 193 are displayed as units of time (e.g., one time per week, one time per month, etc.), the clean crumb tray reminder can be based on a fixed number of toasting cycles. For example, the option of one time per week can correspond to 7 toasting cycles, and the option of one time per month can correspond to 30 toasting cycles. Thus, when a reminder for one time per week is selected, the clean crumb tray reminder is displayed on the user interface after 7 toasting cycles. In some examples, the menu 193 displays options for selecting the frequency for the clean crumb tray reminder as a number of toasting cycles (e.g., 7 toasting cycles, 30 toasting cycles, etc.) instead of, or in combination with, the units of time.

Figure 27:
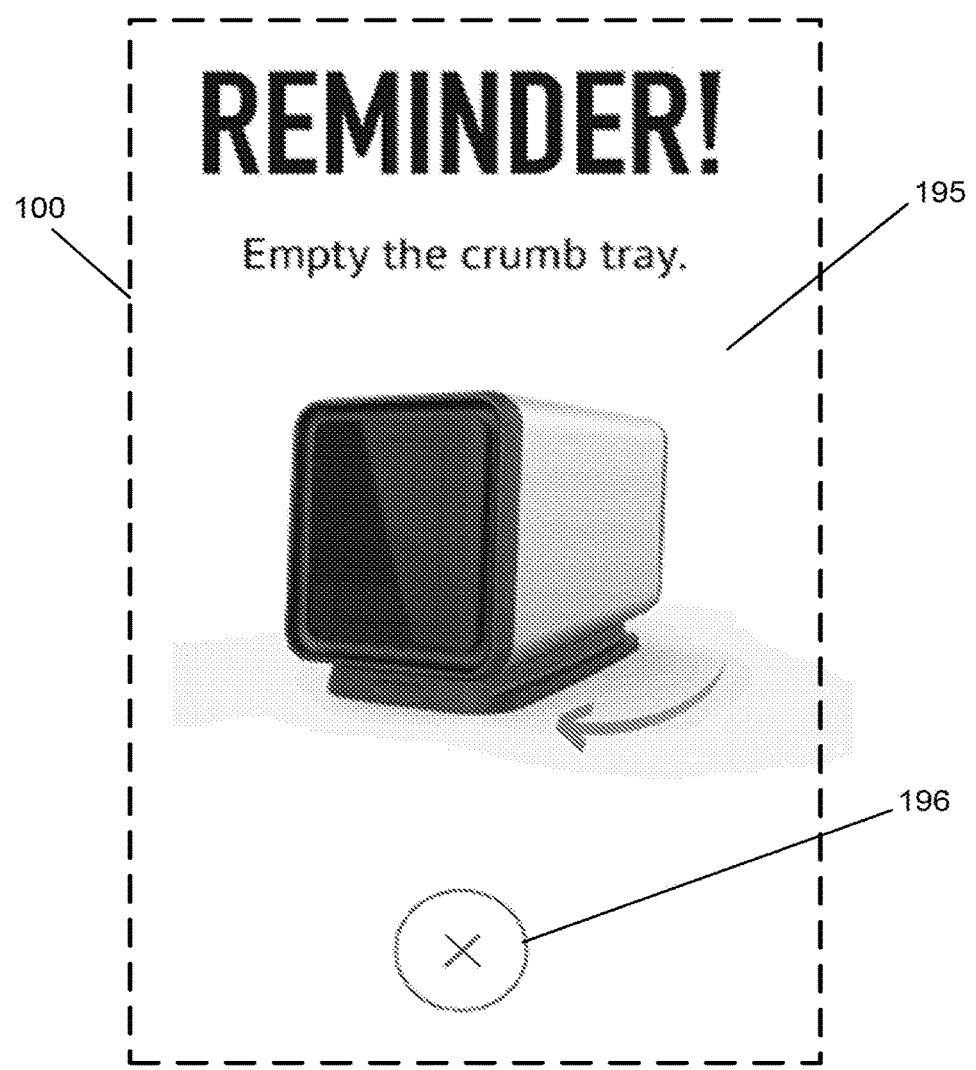
FIG. 27 is a view of the user interface displaying a clean crumb tray reminder screen.

FIG. 27 is a view of the user interface 100 displaying a clean crumb tray reminder screen 195. As shown in FIG. 27, the clean crumb tray reminder screen 195 can include a message such as "REMINDER! Empty the crumb tray." The clean crumb tray reminder screen 195 is displayed on the user interface 100 after the selected frequency for the reminder has been reached. The clean crumb tray reminder screen 195 can be displayed after the last toasting cycle within the selected frequency, and can remain on the user interface 100 (except during the idle mode which will display the clock screen 164 or the sleep mode screen 175) until the reminder is cleared by cleaning the crumb tray and/or selecting clear icon 196. In some examples, the clean crumb tray reminder screen 195 is a lock-out feature that prevents a user from using the toaster 10 until the crumb tray has been cleaned and/or the clear icon 196 has been selected. In some examples, the frequency of the toasting cycles is maintained in the memory of the information processing system even when the toaster 10 is unplugged.

FIGS. 28-32 are views of the user interface 100 that includes another landing screen 201 that can be displayed on the toaster 10 of FIG. 1. The landing screen 201 includes many similar features as the landing screen 101 described above.

As shown in FIGS. 28-32, the landing screen 201 includes a food product selector 202 that includes food product icons 202a-202e each representing a food product that can be selected for toasting and/or cooking by the toaster 10. The food product icons 202a-202e are photograph images of the food product instead of symbols or drawing representations of the food product. In some examples, a pastry, an English muffin, a slice of toast, a bagel, and a waffle are each depicted by the food product icons 202a-202e for selection by a user. The photograph images provide real-life examples of the food product and thus enhance the intuitiveness of the user interface 100. In addition to the example food product icons 202a-202e shown in the figures, it is contemplated that the food product selector 202 can include additional food product icons representing additional food products for selection.

Figure 28:
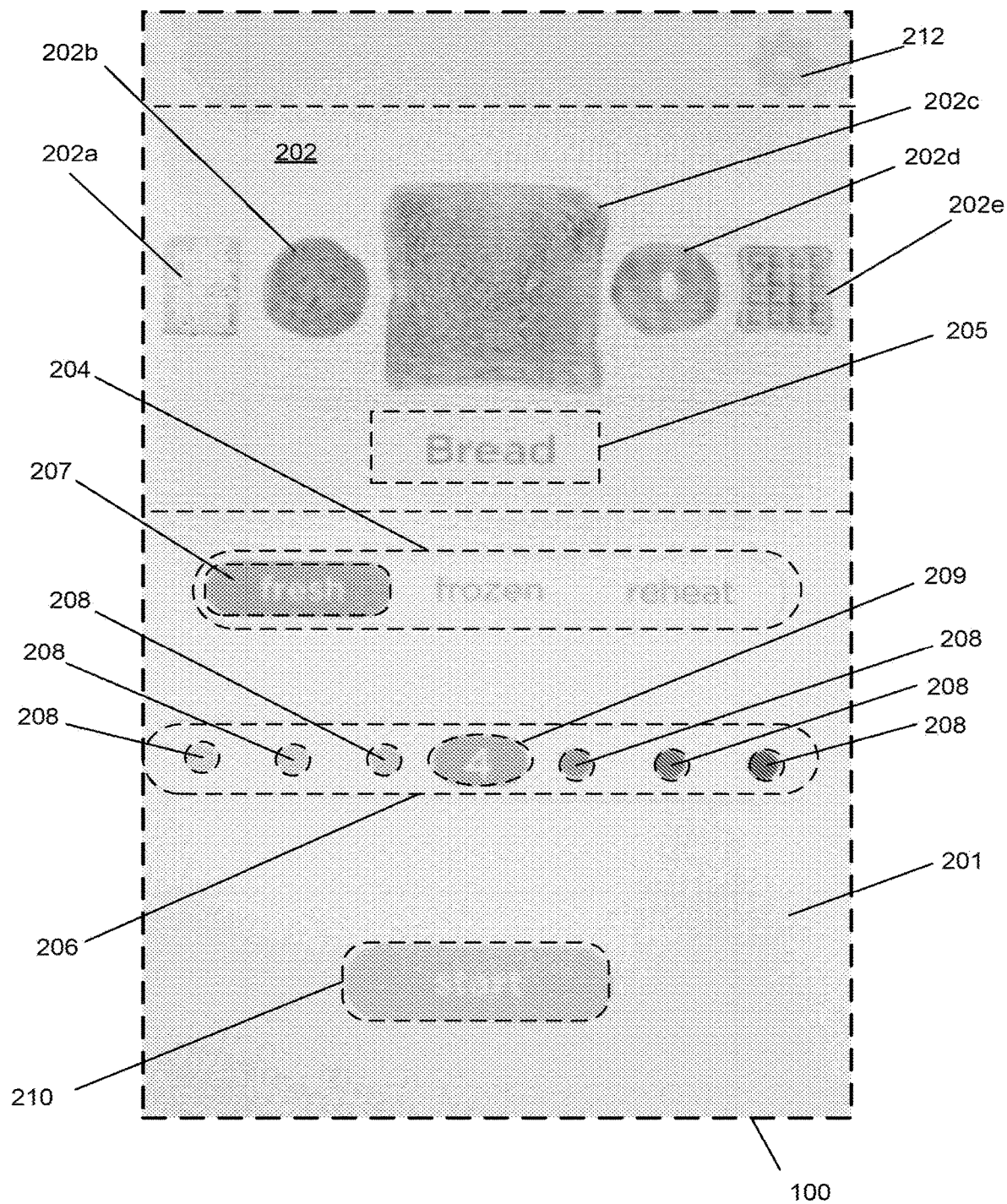
FIG. 28 is a view of a landing screen of the user interface.

In FIG. 28, the food product icon 202c is positioned in the center of the food product icons 202a-202e and is enlarged compared to the other food product icons 202a, 202b, 202d, and 202e to indicate that a slice of toast is selected. Below the food product icon 202c, a message 205 identifying the icon 202c as "Bread" is included to further enhance the intuitiveness of the user interface 100. In some examples, the food product icon 202c is a default selection. In other examples, a previously selected food product icon is displayed as a default selection.

The user interface 100 is configured to detect a hand gesture to select a food product icon 202a-202e. In some examples, user interface 100 detects a finger tap from a user to select a food product icon 202a-202e such that the tapped food product icon 202a-202e moves directly to the center of the food product selector 202. In some examples, the user interface 100 detects a finger swipe, drag, pull, and the like to select a food product icon 202a-202e. The selected food product icon displayed in the center of the food product selector 202 is about 40-60% larger than the unselected food product icons displayed on opposite sides of the selected food product icon.

Figure 29:
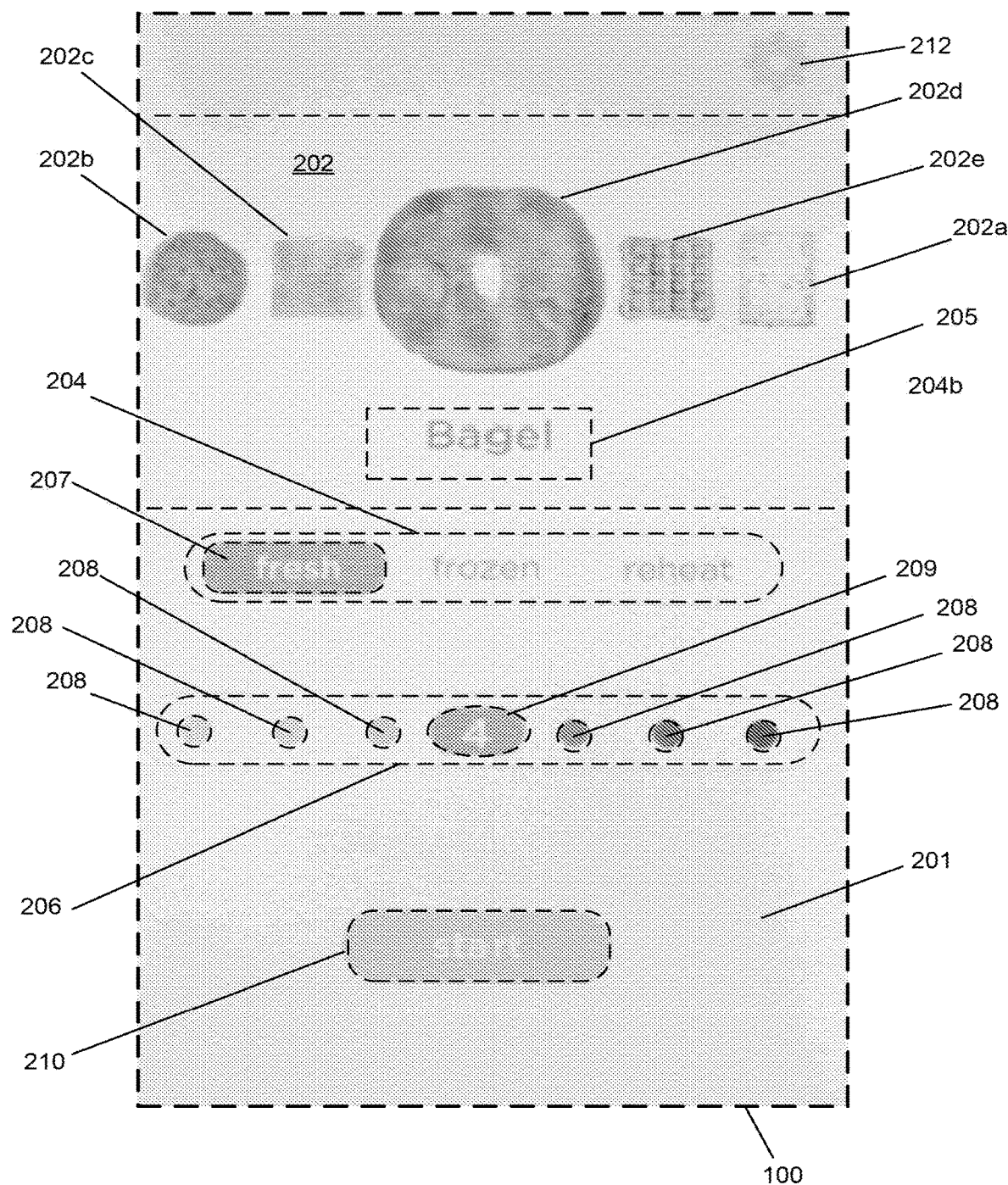
FIG. 29 is a view of another landing screen of the user interface.

FIG. 29 shows the food product icon 202d positioned in the center of the icons 202a-202e and enlarged compared to the other icons 202a, 202b, 202c, and 202e to indicate that a bagel has been selected by the user. Additionally, the message 205 identifies the food product icon 202d as "Bagel" to indicate that a bagel has been selected for toasting which as described above, enhances the intuitiveness of the user interface 100. Each of the food products represented by the icons 202a-202e are selectable by a user for toasting and/or cooking by the toaster 10.

The landing screen 201 includes a cooking mode selector 204 that includes cooking modes identified with the text "fresh", "frozen", and "reheat". Each cooking mode determines a toasting and/or cooking algorithm performed by the toaster 10. For example, the "fresh" cooking mode is selectable to toast and/or cook an ambient temperature food product that has not been previously toasted. The "frozen" cooking mode is selectable to toast and/or cook a frozen food product. The "reheat" cooking mode is selectable to warm a previously toasted or cooked food product with minimal increase to the doneness level. In some examples, the cooking mode selector 204 can include additional types of cooking modes for selection.

The user interface 100 is configured to detect a hand gesture to select a cooking mode, and in response to detecting the hand gesture, the user interface 100 automatically moves a selector icon 207 over the selected cooking mode to highlight the selected cooking mode on the landing screen 201. In some examples, the hand gesture is a finger tap. In some further examples, the hand gesture is a finger swipe, drag, pull, and the like. In some examples, the "fresh" cooking mode is automatically highlighted by the selector icon 207 as a default selection on the landing screen 201. In some further examples, a previously selected cooking mode is automatically highlighted by the selector icon 209 as a default selection on the landing screen 201.

Figure 33:
FIG. 33 is a detailed view of a cooking mode selector.

FIG. 33 is a detailed view of the cooking mode selector 204 that shows the selector icon 207 between the "fresh" and "frozen" cooking modes. As shown in the detailed view of FIG. 33, the color of the selector icon 207 contrasts with the background of the cooking mode selector 204 such that the colored font of the selected cooking mode changes. For example, as the selector icon 207 moves from the "fresh" cooking mode to the "frozen" cooking mode, the text "frozen" changes from a black font to a white font within the selector icon 207.

Figure 30:
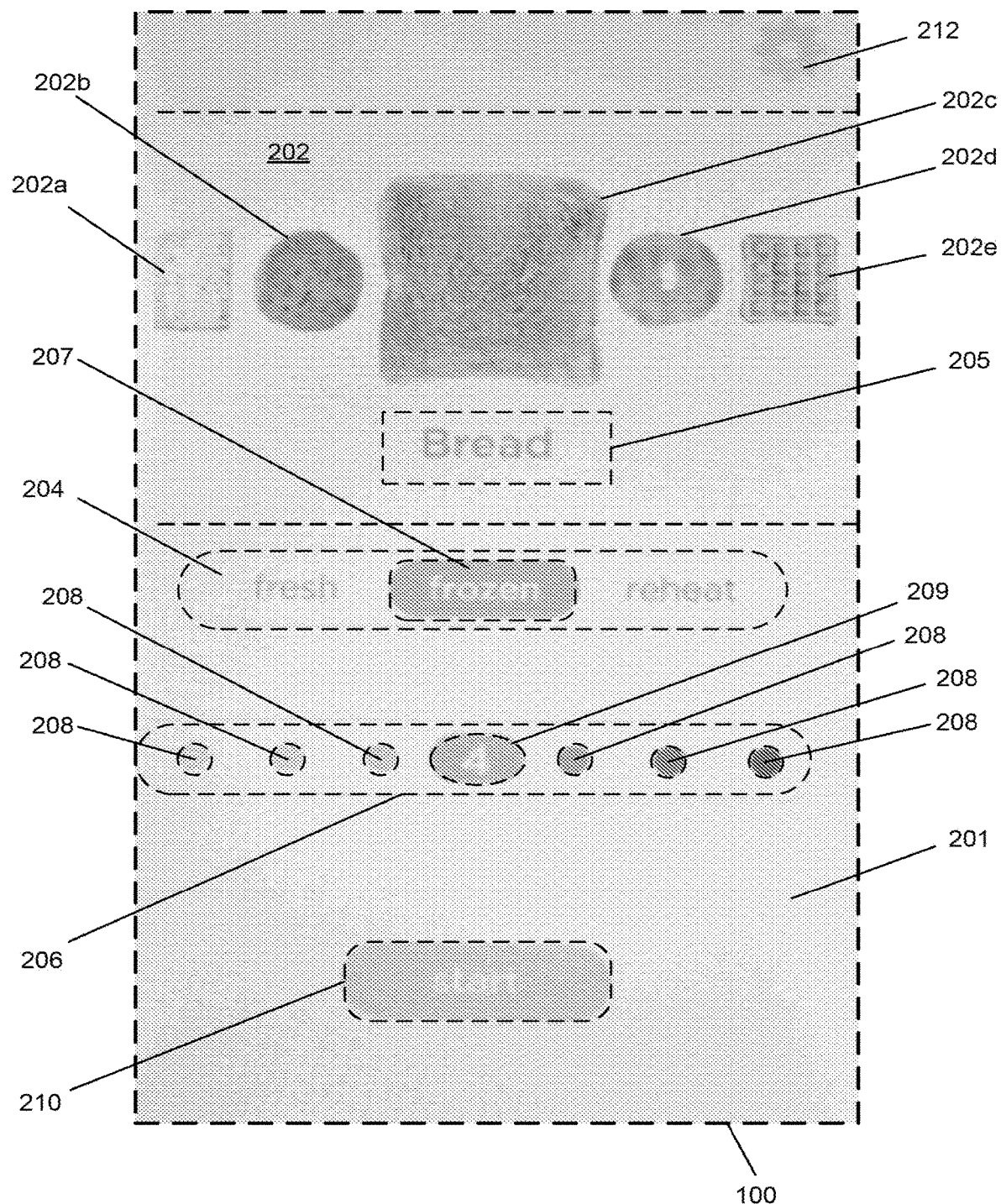
FIG. 30 is a view of another landing screen of the user interface.
Figure 31:
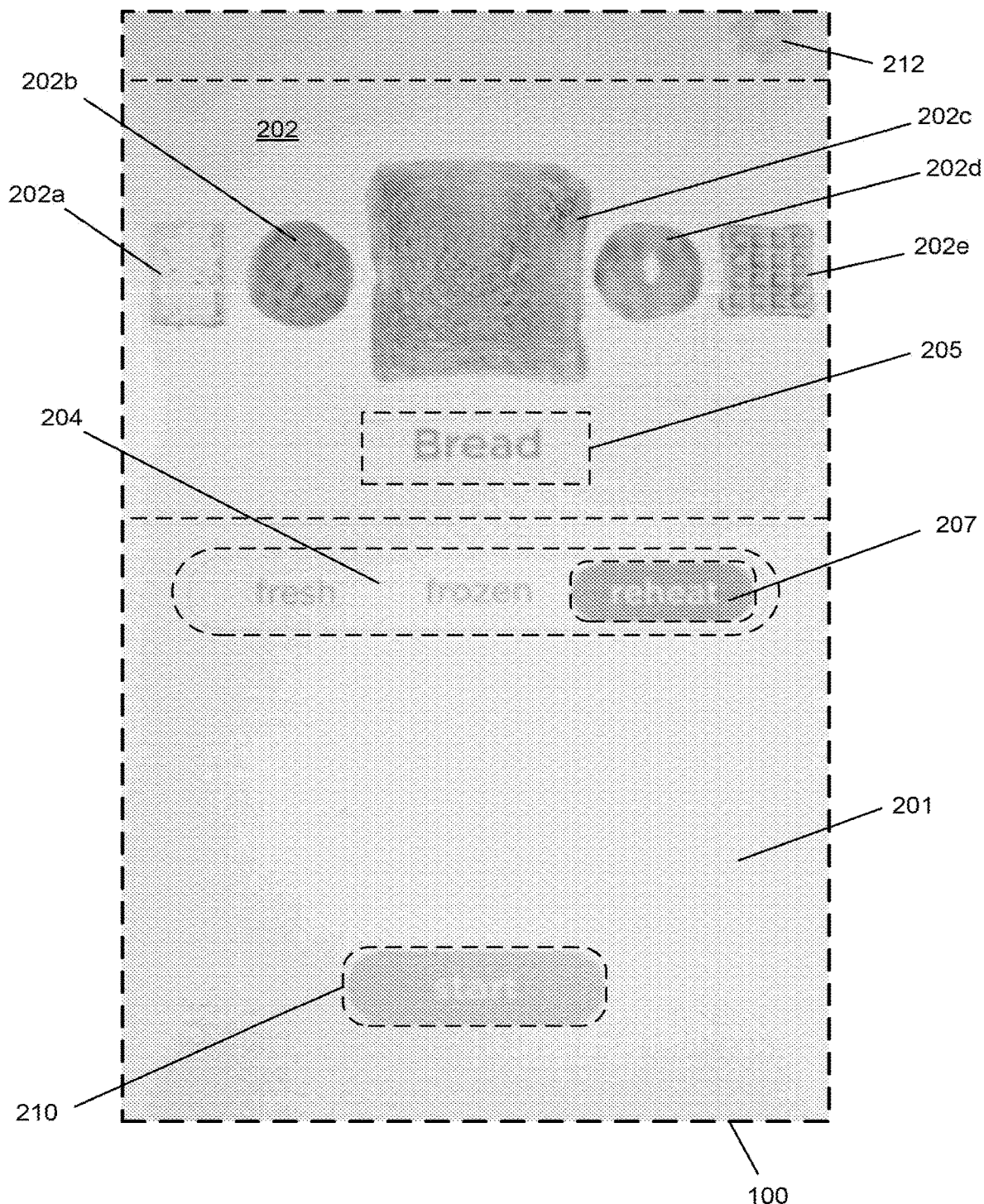
FIG. 31 is a view of another landing screen of the user interface.
Figure 32:
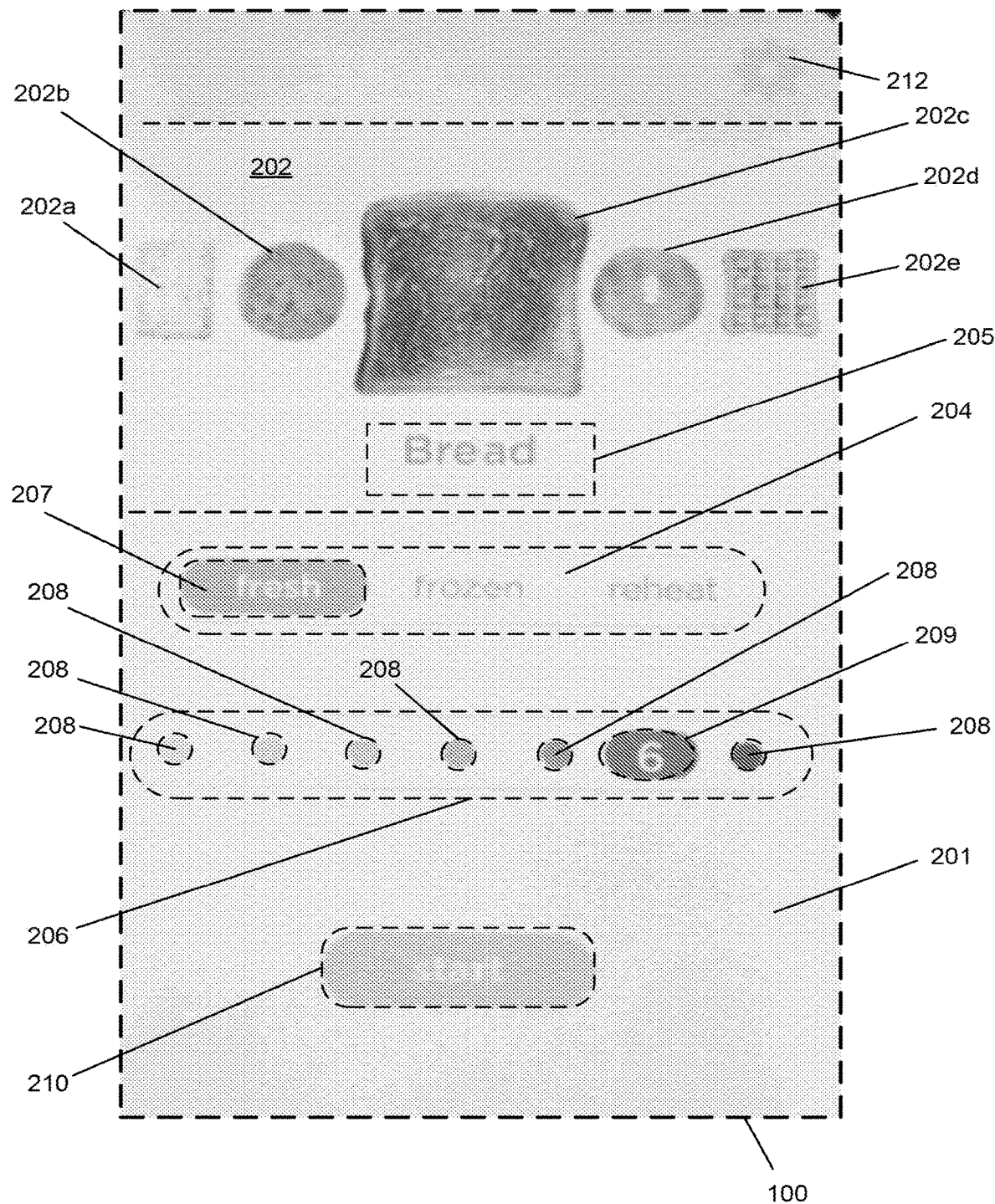
FIG. 32 is a view of another landing screen of the user interface.

FIGS. 28, 29, and 32 show the selector icon 207 selected over the "fresh" cooking mode. FIG. 30 shows the selector icon 207 selected over the "frozen" cooking mode, and FIG. 31 shows the selector icon 207 selected over the "reheat" cooking mode.

When the "fresh" or "frozen" cooking modes are selected, a doneness selector 206 is displayed on the landing screen 201. The doneness selector 206 includes doneness icons 208 that each represent a doneness level. In the examples illustrated in the figures, the doneness selector 206 includes seven doneness icons 208 representing seven doneness levels. It is contemplated that the doneness selector 206 can include additional doneness levels for selection.

The user interface 100 is configured to detect a hand gesture to select a doneness icon 208, and in response to detecting the hand gesture, the user interface 100 automatically moves a selector icon 209 over the selected doneness icon 208 and displays a numerical value of the selected doneness level. In some examples, the hand gesture is a finger tap. In some further examples, the hand gesture is a finger swipe, drag, pull, and the like.

In FIGS. 28-30, the selector icon 209 highlights a middle doneness icon 208 which represents a medium doneness level displayed numerically inside the selector icon 209 as "4". In FIG. 32, the selector icon 209 highlights a doneness icon 208 that represents a higher doneness level which is displayed numerically inside the selector icon 209 as "6". In some examples, the doneness icon 208 representing the doneness level "4" is automatically highlighted by the selector icon 209 as a default selection. In other examples, a previously selected doneness icon 208 is automatically highlighted by the selector icon 209 as a default selection.

The color of the doneness icons 208 varies depending on the associated doneness level. In illustrated examples, the leftmost doneness icon 208 is a light color, and the doneness icons 208 following thereafter from left to right progressively increase in darkness to represent higher doneness levels. In some examples, the leftmost doneness icon 208 is a light brown color, and the darkness of the brown color progressively increases from left to right such that the rightmost doneness icon 208 is a dark brown color. The color of the selector icon 209 also corresponds to the selected doneness icon 208 and the associated doneness level. Additionally, the color of the selected food product icon 202a-202e in the food product selector 202 changes based on the selected doneness icon 208. In some examples, the colors of the doneness icons 208 correspond to the colors described above with reference to FIG. 6.

By visually depicting each doneness level with a different shade of color, the toaster 10 is more effective at conveying doneness than a toaster that presents doneness levels with numerical values only because the different shades of color displayed by the user interface 100 can be more easily understood by a user than a numerical value. This is especially true for first time users of the toaster 10 who are not familiar with the doneness levels of the toaster 10. Accordingly, the doneness selector 206 is more intuitive, and improves user experience over toasters that depict doneness levels with numerical values only.

Referring now to FIG. 31, when the "reheat" cooking mode is selected, the doneness selector 206 is not displayed on the landing screen 201. This is because the "reheat" cooking mode does not toast or cook the selected food product. Instead, the "reheat" cooking mode warms a previously toasted or cooked food product with minimal increase to the doneness level.

Figure 34:
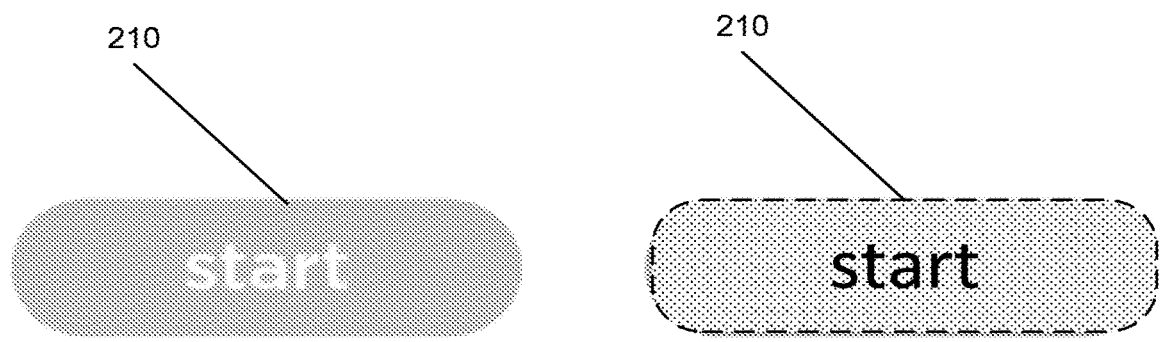
FIG. 34 is a detailed view of a start button.

The landing screen 201 further includes a start icon 210 that is selectable to initiate a cooking cycle based on the food product selected in the food product selector 202, the cooking mode selected in the cooking mode selector 204, and the doneness level selected in the doneness selector 206. FIG. 34 shows detailed views of the start icon 210. The start button when selected darkens to indicate that it has been selected (e.g., the start icon 210 on the left is unselected, and the start icon 210 on the right is selected). When the start icon 210 is selected, the toaster lowers the food product inside the cooking cavity 14, and energizes the heating elements for toasting and/or cooking the food product inside the cooking cavity 14.

Figure 35:
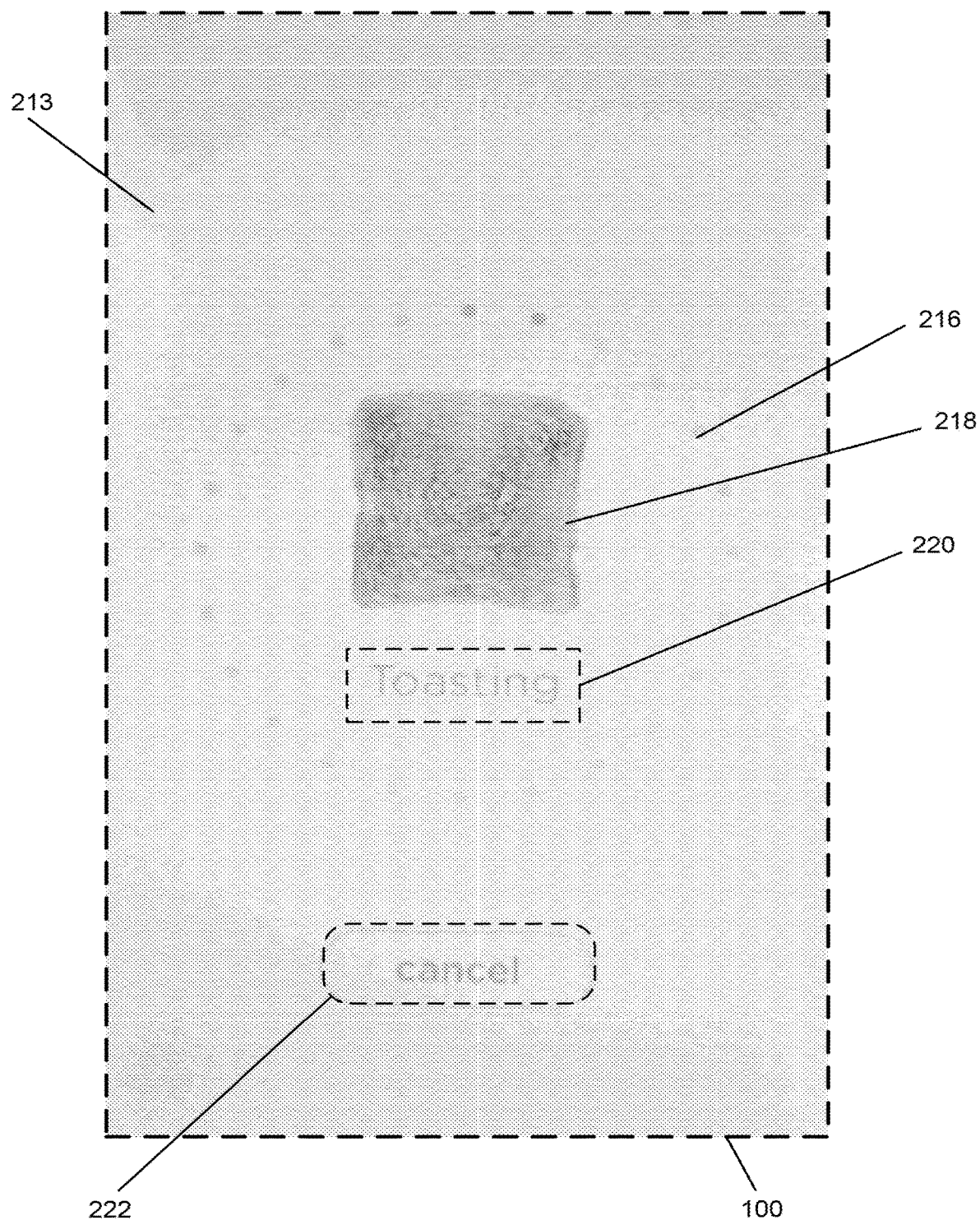
FIG. 35 is a view of the user interface displaying a cooking screen.

After the start button is selected, the user interface 100 transitions to the cooking screen 213 of FIG. 35. The cooking screen 213 includes an image 218 of the food product selected in the food product selector 202. The color of the food product in the image 218 corresponds to the doneness level selected in the doneness selector 206.

The cooking screen 213 includes a message box 220 to display a message on the status of the cooking of the cooking cycle. For example, the message box 220 can display a countdown clock showing the time remaining before the cooking cycle is completed.

Additionally, the message box 220 can display a message describing a function being performed by the heating elements 18 of the toaster 10. For example, as shown in FIG. 35, the message box 220 displays a message such as "Toasting" to indicate a status of the selected combination of food product, cooking mode, and doneness level during the cooking cycle by the toaster 10. Additional types of messages are contemplated. For example, additional types of messages may include "heating", "warming", "cooking", "searing", "crisping", and the like. The message displayed by the message box 220 communicates back to the user information that is beyond what the user entered or selected on the landing screen 201. Thus, the message displayed by the message box 220 enhances user experience over cooking appliances that only depict a countdown clock because the message provides additional information beyond a mere countdown such as the function that is being performed by the heating elements 18 of the toaster 10. As an illustrative example, the word "Heating" can be displayed in the message box 220 to indicate that the heating elements 18 are heating up. As a further illustrative example, the word "Searing" can be displayed in the message box 220 when the heating elements 18 are searing a food product that has been lowered into the cooking cavities 14. As another illustrative example, the word "Crisping" can be displayed in the message box 220 when the heating elements 18 are rapidly browning the surface of a food product. As yet another illustrative example, the word "Warming" can be displayed in the message box 220 when the heating elements 18 are warming a food product that was previously cooked or toasted.

In some examples, the cooking screen 213 also includes a progress ring 216 that encircles the image 218. The progress ring 216 includes dots that become filed based on the amount of toasting or cooking time remaining. When the cooking cycle is 100% complete, all of the dots in the progress ring 216 are filled. The progress ring 216 further enhances user experience by providing information to the user on the time remaining for the cooking cycle to be completed, while the user is waiting for the cooking cycle to complete.

Figure 36:
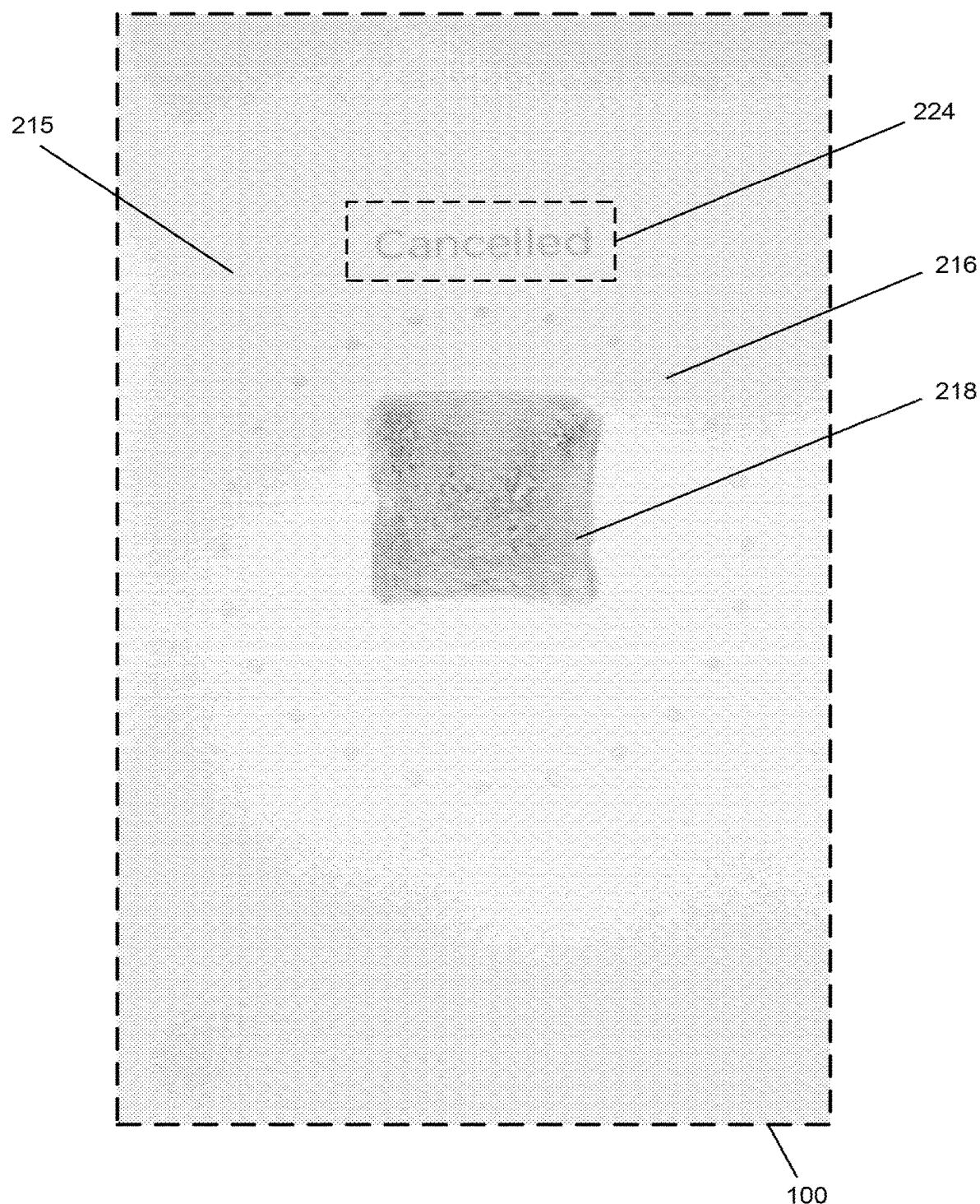
FIG. 36 is a view of the user interface displaying a cancel screen.

The cooking screen 213 further includes a cancel icon 222. When the cancel icon 222 is selected, the user interface 100 transitions to the cancel screen 215 of FIG. 36, and the toaster immediately stops the cooking cycle. As shown in FIG. 36, a message box 224 displays the message "Cancelled" and the dots in the progress ring 216 retract back to none being filled. After a predetermined amount of time, the cancel screen 215 fades out, and the user interface 100 transitions back to the landing screen 201 of FIGS. 28-32.

Figure 37:
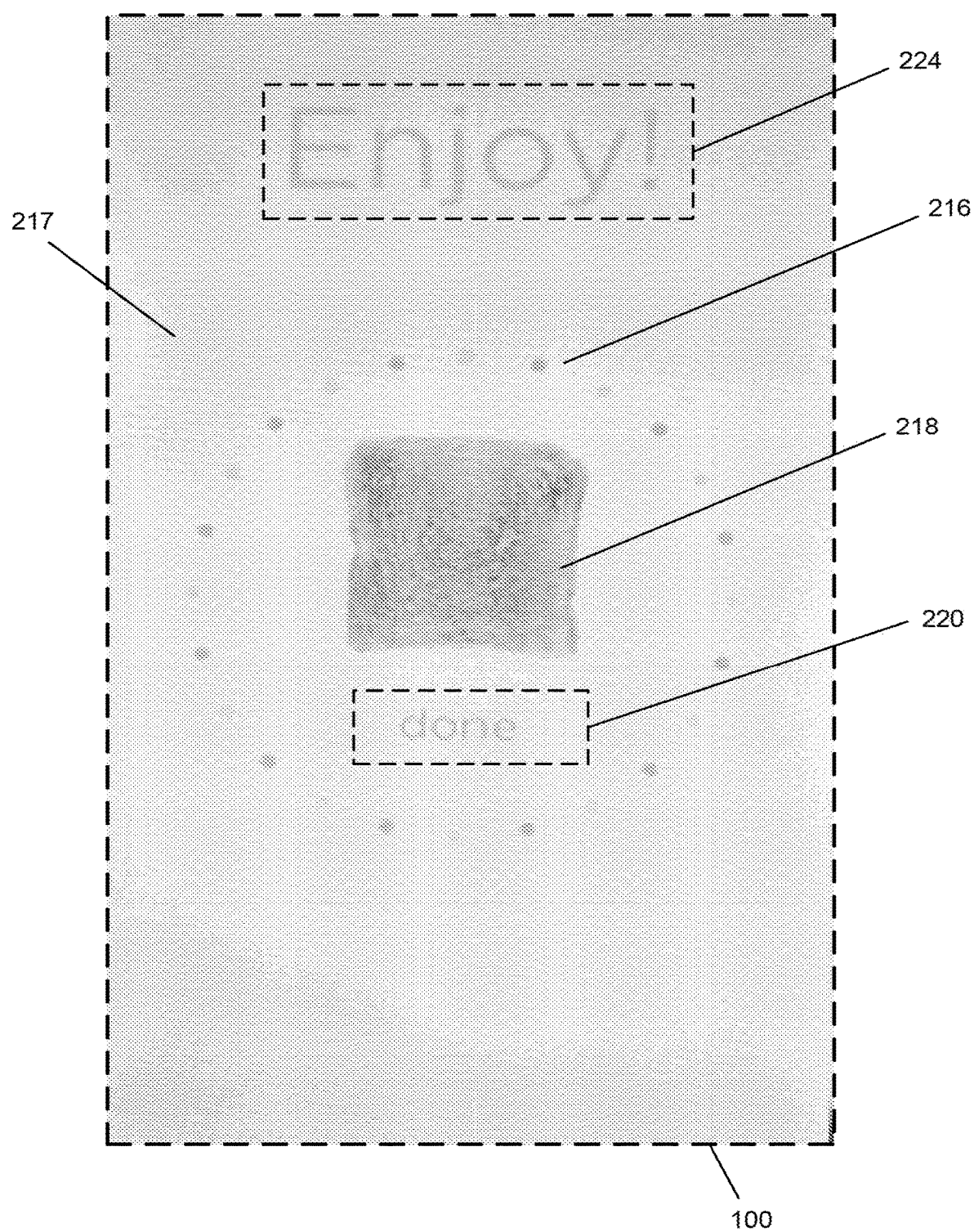
FIG. 37 is a view of the user interface displaying a finished screen.
Figure 38:
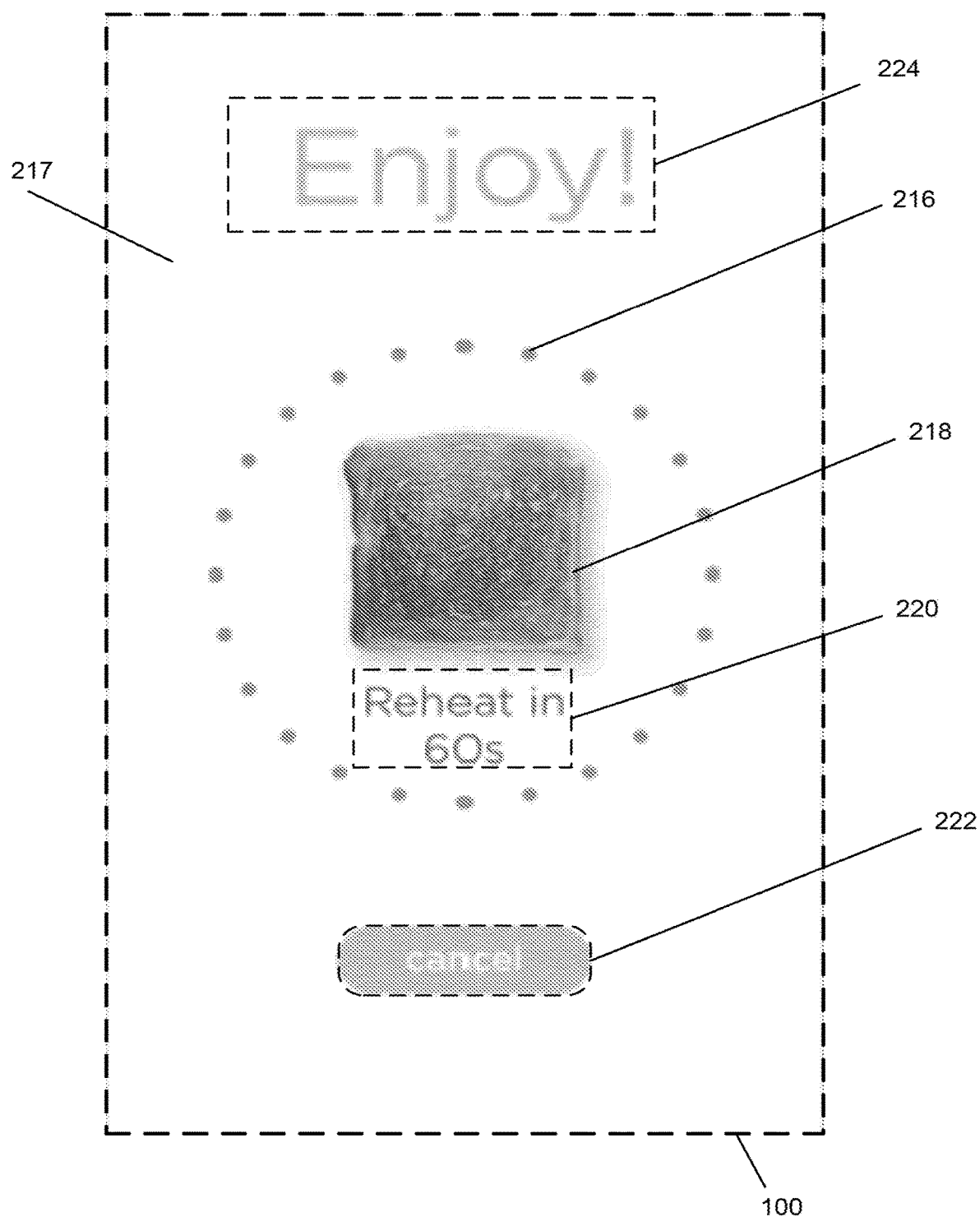
FIG. 38 is a view of the user interface displaying another finished screen.

When the cancel icon 222 is not selected, such that the cooking cycle performed by the toaster is allowed to complete, the user interface 100 transitions to the finished screens 217 of FIGS. 37 and 38. As shown in FIGS. 37 and 38, the finished screen 217 includes a message box 224 to display one or more message regarding the status of the cooking cycle. In some examples, the message box 224 displays a countdown clock on the cooking screen 213 during a cooking cycle, and after completion of the cooking cycle, the countdown clock fades out and a message or command such as "Enjoy!" is displayed in the message box 224. The message or command displayed in the message box 224 goes beyond displaying the status of the cooking cycle for the selected combination of food product, cooking mode, and doneness level. Instead, the message or command displayed in the message box 224 provides useful information to the user and thereby enhances the user experience. In some examples, the progress ring 216 displays an animation pattern as an additional indicator to the user that the cooking cycle is complete. In some further examples, while the finished screen 217 is displayed on the user interface 100, the toaster 10 may also simultaneously play an audio clip (according to a volume level set by the user in a settings screen 223) as a further indicator to the user that the cooking cycle is complete.

The finished screen may also include a message box 220 displaying another message such as "done". After a predetermined amount of time, the message "done" in the message box 220 fades out and another message is displayed. As shown in FIG. 38, in some examples, the message box 220 displays the message "Reheat in 60 seconds" and then the message in the message box 220 automatically updates to show a countdown from 60 seconds before a reheat cooking mode is automatically initiated by the toaster 10. As described above, the reheat cooking mode warms the food product with minimal increase to a selected doneness level.

Figure 43:
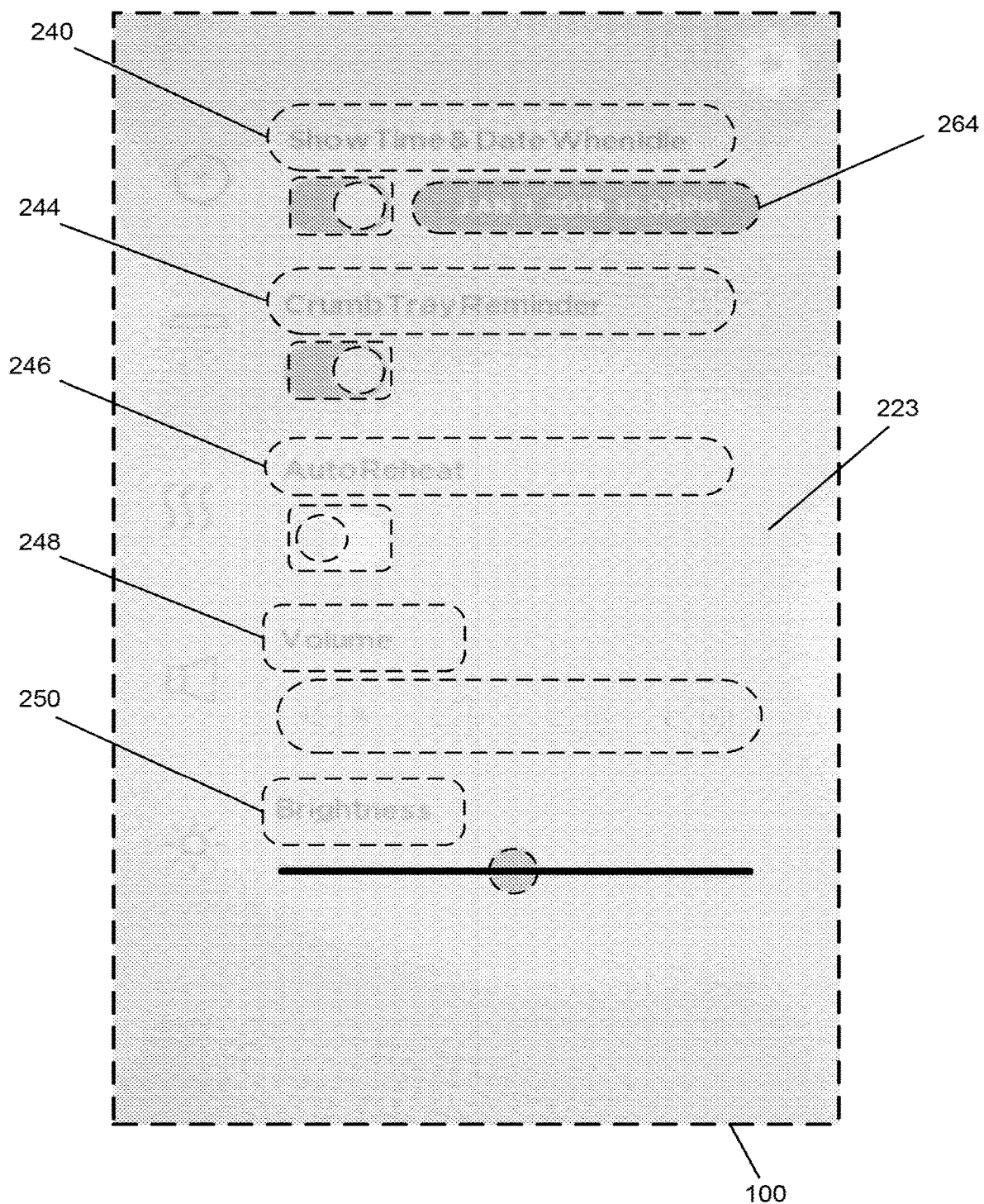
FIG. 43 is a view of the user interface displaying another settings screen.

The toaster 10 is stopped from automatically initiating the reheat cooking mode when a sensor detects that the food product has been removed by the user from the cooking cavities 14. Alternatively, the finished screen 217 can also include the cancel icon 222 that when selected, stops the toaster 10 from automatically initiating the reheat cooking mode. When the toaster is stopped from automatically initiating the reheat cooking mode either by removing the food product from the cooking cavities 14 or selecting the cancel icon 222, the user interface 100 transitions back to the landing screen 201 of FIGS. 28-32. In some examples, the automatic reheat cooking mode can be disabled by the user in a settings screen 223 (see FIGS. 41 and 43).

Figure 39:
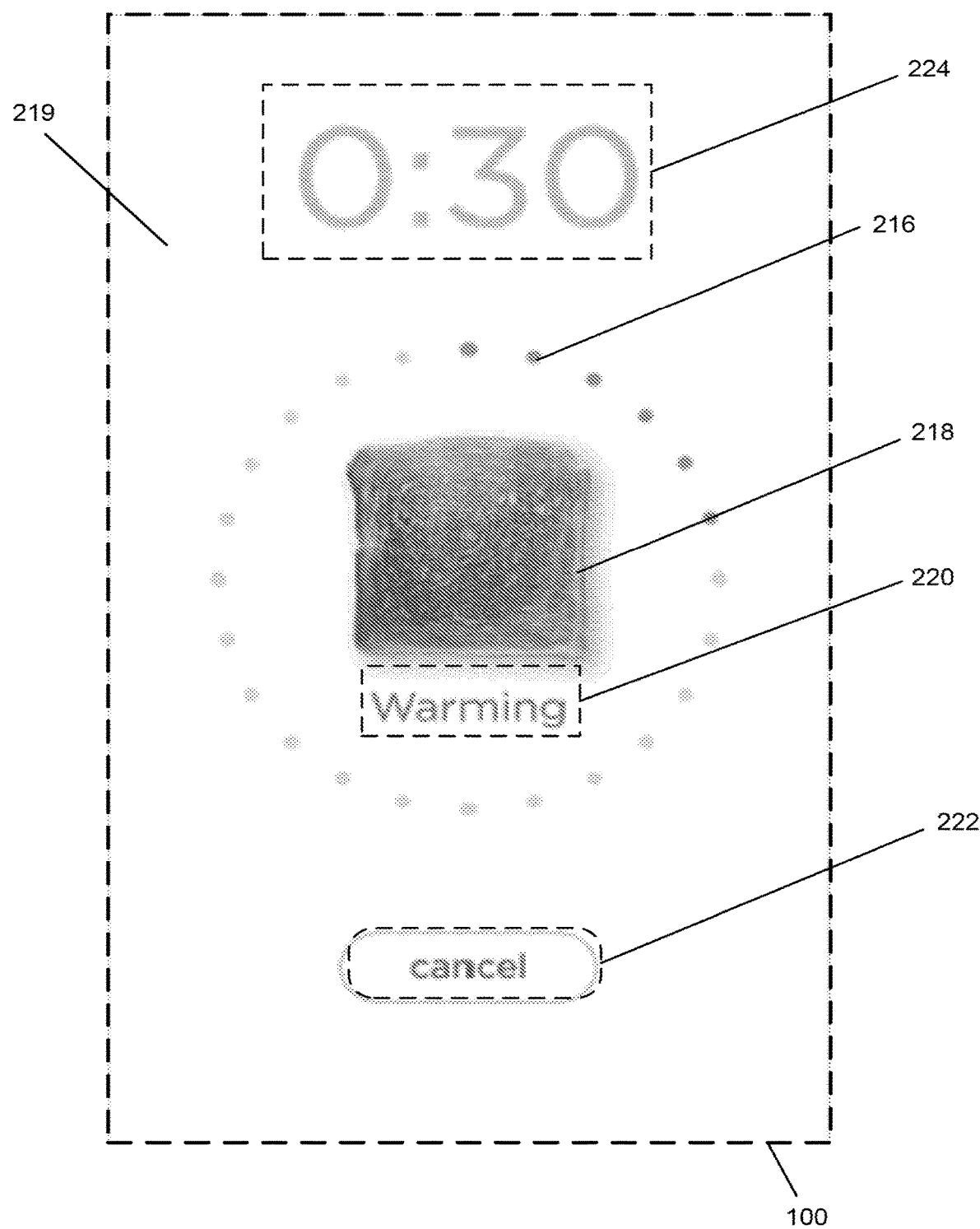
FIG. 39 is a view of the user interface displaying a reheat screen.

When reheat cooking mode is initiated (e.g., when the automatic reheat cooking mode is not disabled, and the food product is not removed from the cooking cavities or the cancel icon 222 is not selected), the user interface 100 transitions to the reheat screen 219 of FIG. 39. The reheat screen 219 includes the message box 224 to display the status of the reheat cooking cycle such as a countdown clock. The reheat screen 219 may also include the message box 220 to display a further message on the status of the reheat cooking cycle. For example, the message box 220 displays the message "Warming." Like in the cooking screen 213, the reheat screen 219 includes the progress ring 216 that encircles the image 218. The dots in the progress ring 216 become filed based on the amount of time remaining in the reheat cooking cycle. Also, the reheat screen 219 includes the cancel icon 222 to cancel the reheat cooking cycle.

Figure 40:
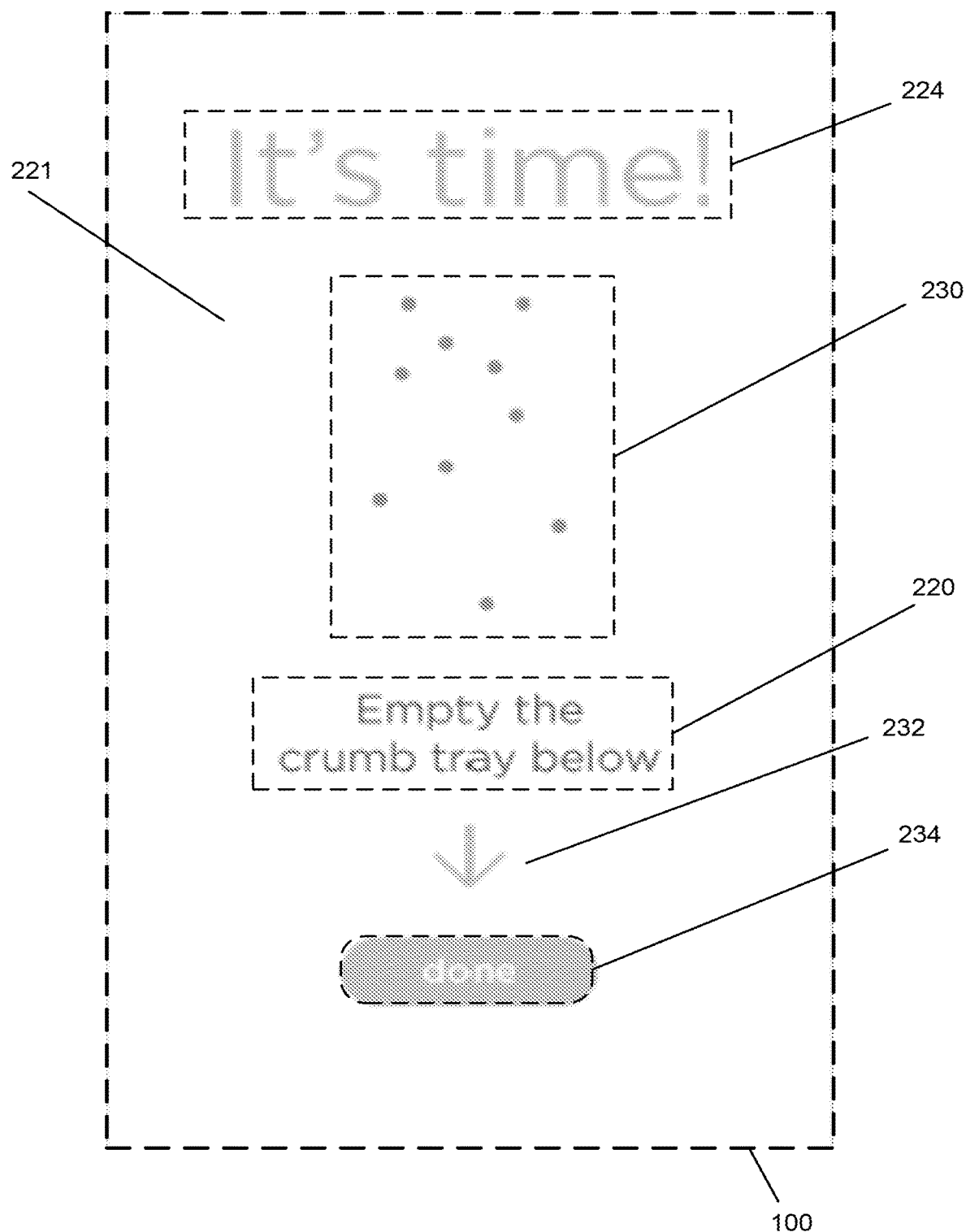
FIG. 40 is a view of the user interface displaying a clean crumb tray reminder screen.

FIG. 40 is a view of the user interface 100 displaying a clean crumb tray reminder screen 221. As shown in FIG. 40, the clean crumb tray reminder screen 221 includes the message box 224 to display a message as indicator to the user that the crumb tray needs to be cleaned after a predetermined number of toasting cycles. For example, the message box 224 can display the message "It's time!". Additionally, the clean crumb tray reminder screen 221 includes the message box 220 that includes instructions such as "Empty the crumb tray below".

The clean crumb tray reminder screen 221 can include one or more graphics such as an image 230 that illustrates a representation of bread crumbs, and an arrow 232 that points in the direction where the crumb tray is located in the chassis of the toaster 10.

Figure 44:
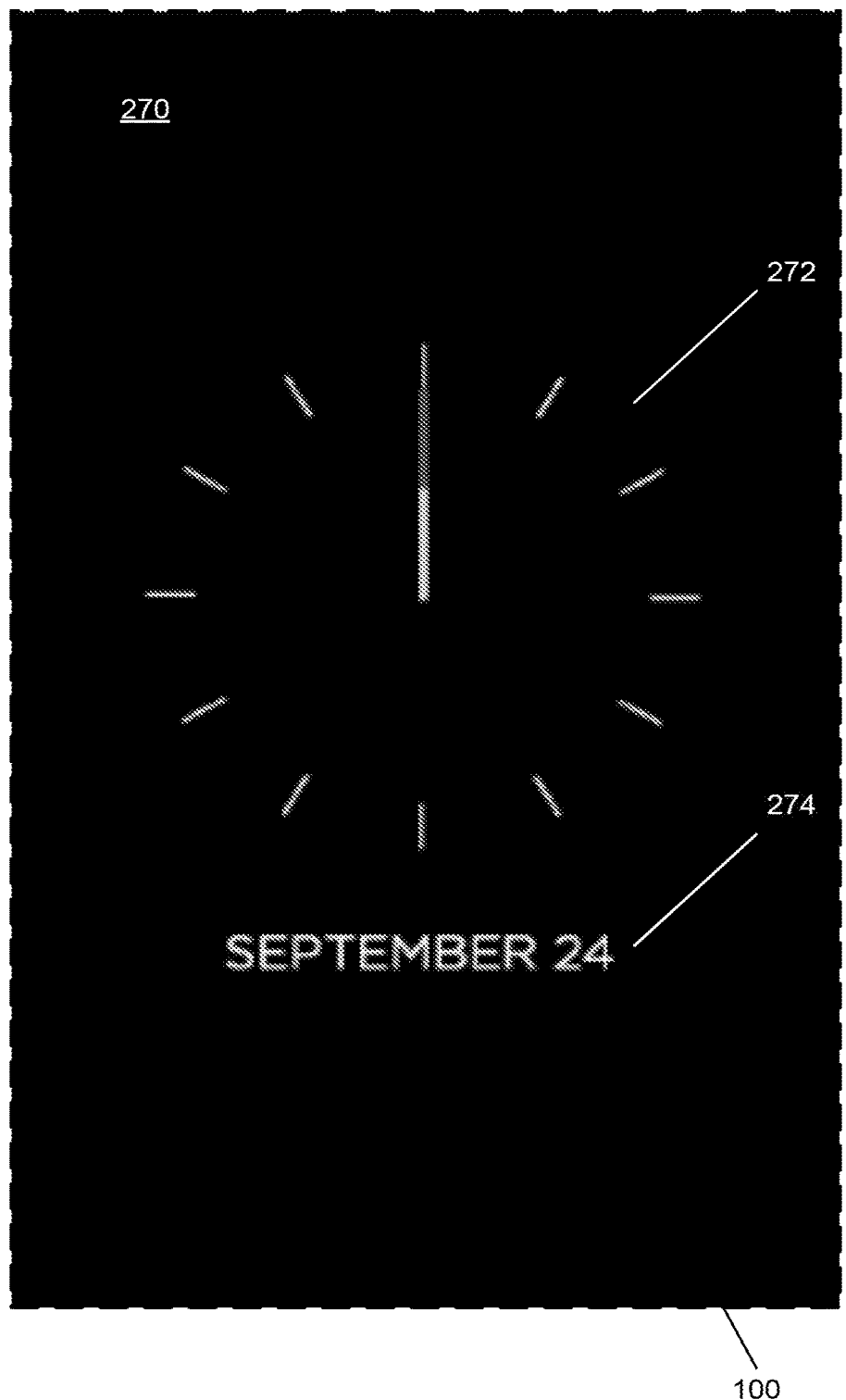
FIG. 44 is a view of the user interface of displaying an idle screen.

The clean crumb tray reminder screen 221 further includes a done button 234 that when selected, causes the clean crumb tray reminder screen 221 to fade out and the user interface 100 to transition to the landing screen 201 of FIGS. 28-32 or to an idle screen 270 (see FIG. 44).

Figure 41:
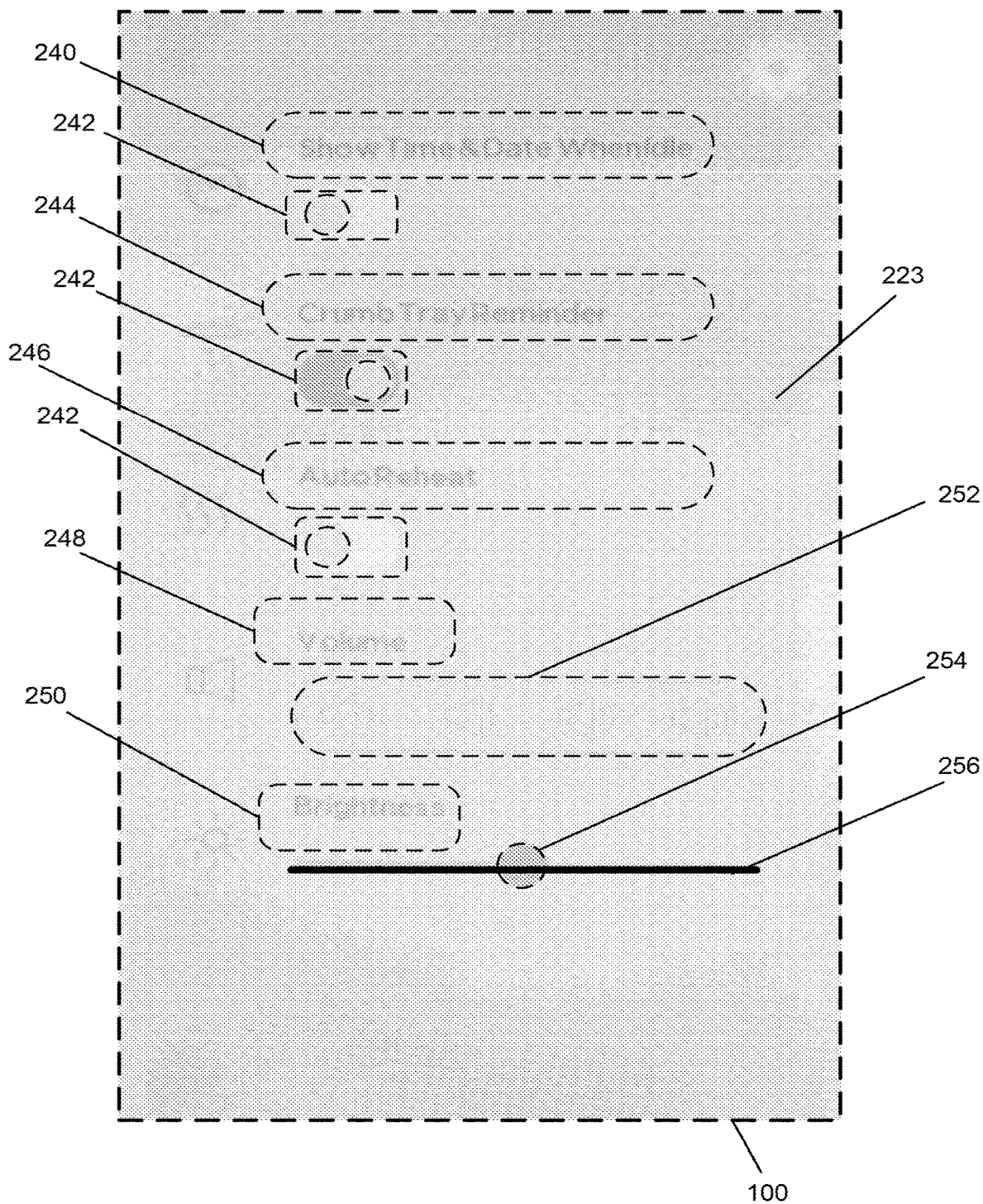
FIG. 41 is a view of the user interface displaying a settings screen.

Referring back to FIGS. 28-32, the landing screen 201 includes a settings icon 212 that when selected by the user, causes the user interface 100 to transition to the settings screen 223 of FIG. 41. The settings screen 223 includes a "Show Time & Date" feature 240 and an associated selector icon 242 to enable or disable this feature. In some examples, selector icon 242 includes a dot that can be tapped or swiped from one side to the other enable or disable the "Show Time & Date" feature 240. The settings screen 223 further includes a "Crumb Tray Reminder" feature 244 and an "Automatic Reheat Cooking Mode" feature 246, and associated selector icons 242 to enable or disable these features.

The settings screen 223 further includes a "Volume" feature 248 that includes one or more selectable options (see above where it is described that the toaster 10 may play an audio clip to indicate that the cooking cycle is complete). For example, a user may select mute, low volume, medium volume, or high volume options for the volume of the toaster 10.

Additionally, the settings screen 223 also includes a "Brightness" feature 250 that includes a bar 256 with a pointer 254 that can be moved on the user interface 100 from left to right and from right to left to adjust a brightness level of the user interface 100.

Figure 42:
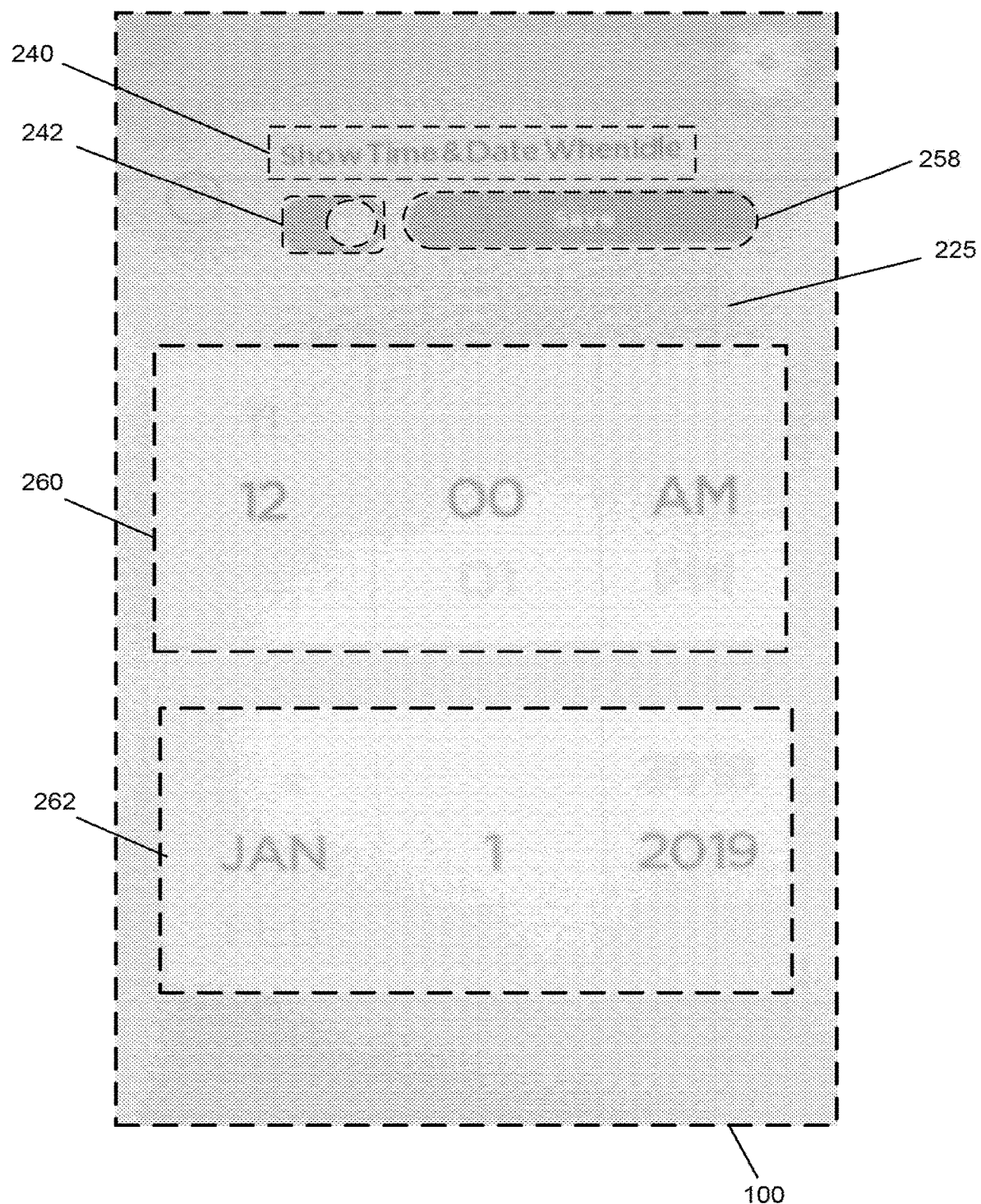
FIG. 42 is a view of the user interface displaying a date and time adjustment screen.

In response to a selection of the selector icon 242 to enable the "Show Time & Date" feature 240 in the settings screen 223, the user interface 100 transitions to the date and time adjustment screen 225 of FIG. 42. As shown in FIG. 42, the date and time adjustment screen 225 includes a first scroll wheel 260 to set the time, and a second scroll wheel 262 to set the date. The scroll wheels 260, 262 are operable to scroll up to ascend and scroll down to descend selections. The date and time adjustment screen 225 further includes a save icon 258 to save the selected date and time. In response to a selection of the save icon 258, the user interface 100 transitions back to the settings screen 223 where the set date and time are displayed in box 264. If a user selects the box 264, the user interface 100 will generate the scroll wheels 260, 262 for adjusting the date and time. The scroll wheels 260, 262 display the set time and date. If a user clicks the selector icon 242 again, the set time and date are cleared from the box 264.

When the "Show Time & Date" feature 240 is enabled, the user interface 100 displays an idle screen 270 that includes the set time 272 and date 274. The idle screen 270 is displayed after the user interface 100 detects inactivity for a predetermine amount of time. For example, the user interface 100 can transition from the landing screen 201 to the idle screen 270 after three minutes of inactivity. The user can cause the user interface 100 to transition back to the landing screen 201 by tapping any area on the idle screen 270.

Figure 45:
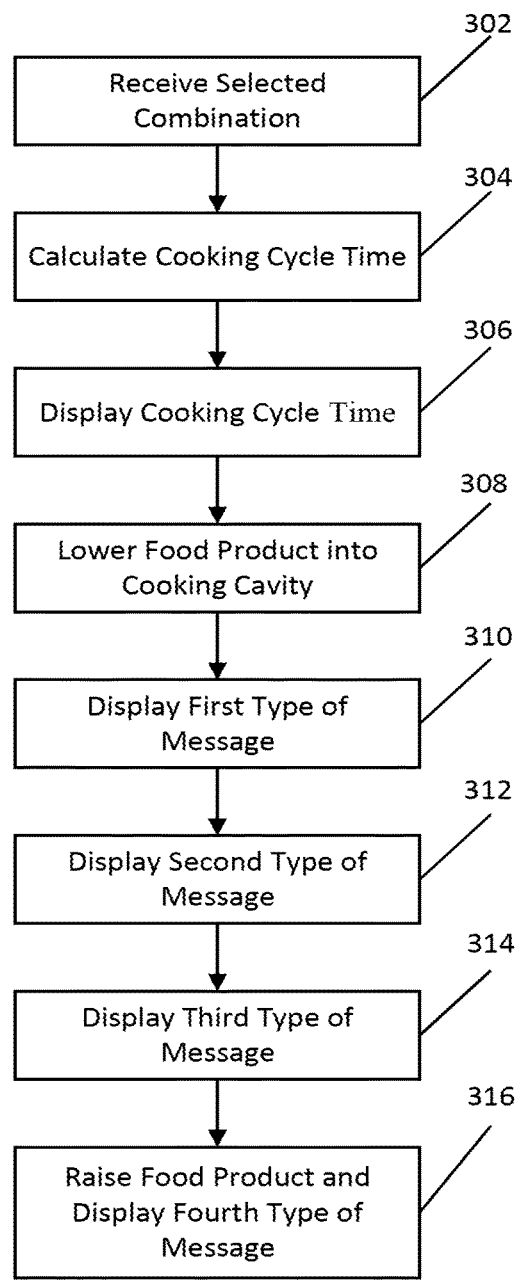
FIG. 45 illustrates a work flow for the toaster.

FIG. 45 illustrates a workflow 300 for the toaster 10. The workflow 300 includes the following steps: a step 302 of receiving a selected combination of food product, cooking mode, and doneness level, and a selection to initiate a cooking cycle from the user interface 100; a step 304 of calculating the cooking cycle time based on variables in addition to the selected combination of food product, cooking mode, and doneness level including, but not limited to: (i) ambient heat in the cooking cavity 14; (ii) a line voltage reading; and (iii) other contemplated variables; a step 306 of displaying on the user interface 100 the cooking cycle time as a countdown clock; a step 308 of lowering the food product into the cooking cavity 14 to a point where toasting optimization across the surface area of the food product occurs; a step 310 of displaying a first type of message such as "Heating" for a first portion of the cooking cycle (e.g., 50% of toast time after 10-15 seconds are subtracted); a step 312 of displaying a second type of message such as "Searing" for a second portion of the cooking cycle (e.g., 50% of toast time after 10-15 seconds are subtracted); a step 314 of displaying a third type of message such as "Crisping" when 10-15 seconds of time remains in the cooking cycle, and displaying the countdown clock in hundredths of seconds until the countdown clock reaches 00:00; and a step 316 of raising the food product and displaying a fourth type of message such as "Enjoy" when cooking cycle is complete and the food product is ready for removal from the cooking cavity 14.

With respect to step 308 described above, in some embodiments, the toaster 10 lowers different types of food products to different locations within the cooking cavity 14. As an illustrative example, the toaster 10 can lower an English muffin to a preferred stop in the cooking cavity 14 that may be different for a slice of toast or a pastry based on the size of these food products. An English muffin, for example, may be lowered less than the slice of bread to keep the center of the English muffin at the center of the heating area within the cooking cavity 14. Thus, the preferred stop in the cooking cavity for each food product selected on the landing screen 201 may be different based on the size of the selected food product.

Figure 46:
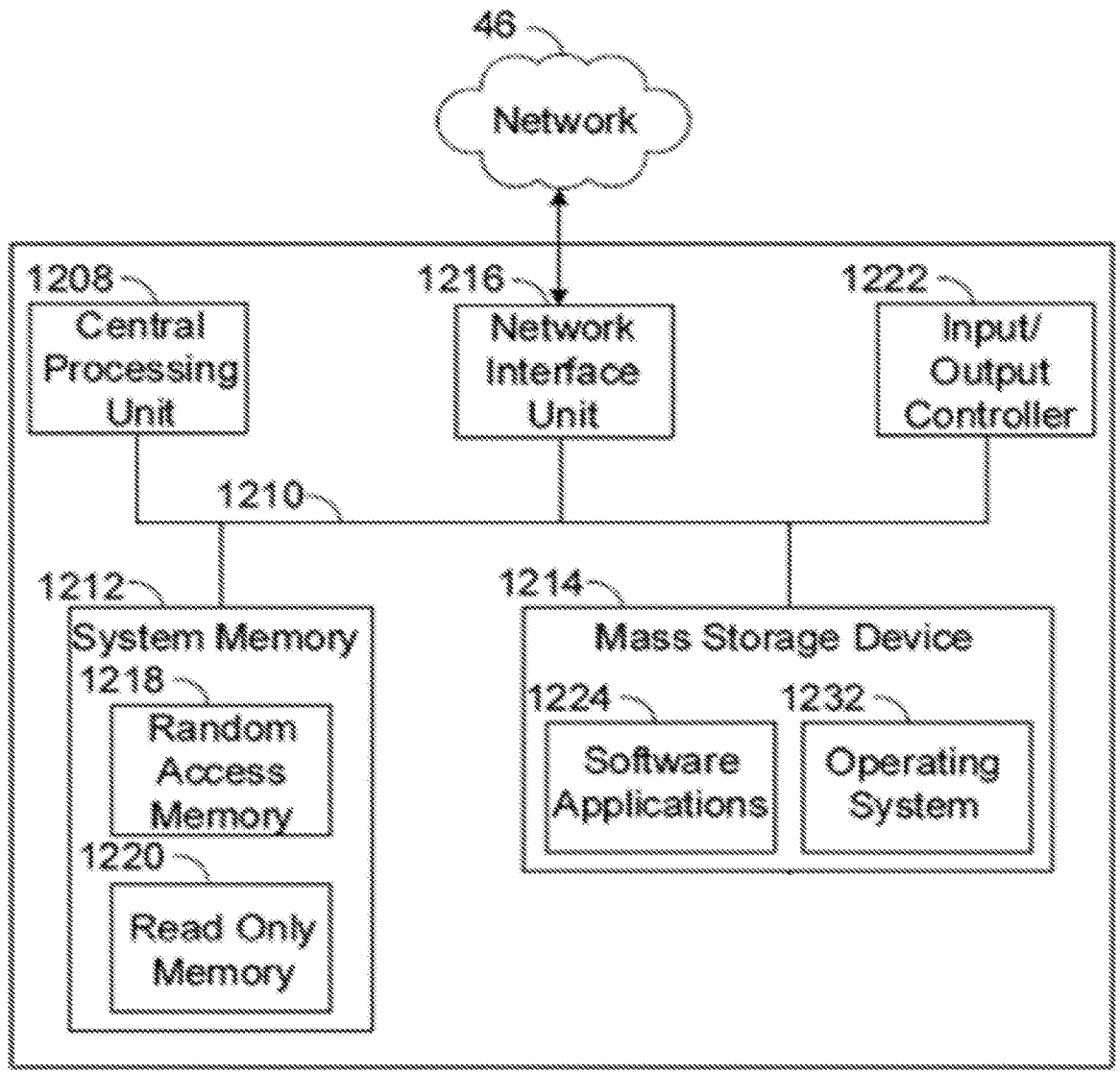
FIG. 46 illustrates example physical components of a computing device.

FIG. 46 illustrates example physical components of a computing device associated with the toaster 10 and the user interface 100. As illustrated, the computing device includes at least one processor or central processing unit ("CPU") 1208, a system memory 1212, and a system bus 1210 that couples the system memory 1212 to the CPU 1208. The central processing unit 1208 is an example of a processing device. The system memory 1212 includes a random access memory ("RAM") 1218 and a read-only memory ("ROM") 1220. A basic input/output system containing the basic routines that help to transfer information between elements within the computing device, such as during startup, is stored in the ROM 1220. The computing device further includes a mass storage device 1214 able to store software instructions and data.

The mass storage device 1214 is connected to the CPU 1208 through a mass storage controller connected to the system bus 1210. The mass storage device 1214 and its associated computer-readable data storage media provide non-volatile, non-transitory storage for the computing device. Although the description of computer-readable data storage media contained herein refers to a mass storage device, such as a hard disk or CD-ROM drive, it should be appreciated that computer-readable data storage media can be any available non-transitory, physical device or article of manufacture from which the device can read data and/or instructions. The mass storage device 1214 is an example of a computer-readable storage device.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device.

According to various embodiments, the computing device may operate in a networked environment using logical connections to remote network devices through the network 46, such as a local network, the Internet, or another type of network. The computing device connects to the network 46 through a network interface unit 1216 connected to the system bus 1210. The network interface unit 1216 may also be utilized to connect to other types of networks and remote computing systems. The computing device also includes an input/output controller 1222 for receiving and processing inputs from a number of other devices, including the user interface 100 display screen, or another type of input device. Similarly, the input/output controller 1222 may provide outputs to the user interface 100 display screen.

As mentioned above, the mass storage device 1214 and the RAM 1218 of the device can store software instructions and data. The software instructions include an operating system 1232 suitable for controlling the operation of the toaster 10. The mass storage device 1214 and/or the RAM 1218 also store software instructions, that when executed by the CPU 1208, cause the toaster 10 to provide the functionality discussed herein.

Various modifications and alterations of this disclosure will become apparent to those skilled in the art without departing from the scope and spirit of this disclosure, and it should be understood that the scope of this disclosure is not to be unduly limited to the illustrative examples set forth herein.

The invention claimed is:

1. A toaster comprising:
   a housing that defines one or more cooking cavities, each cooking cavity having a lift to lower and raise a food product in a vertical direction inside the cooking cavity, and heating elements to cook the food product arranged inside the cooking cavity; and
   a user interface operable to control a cooking cycle inside the one or more cooking cavities, the user interface configured for selection of a food product, cooking mode and doneness level, and to initiate a cooking cycle performed by the toaster;
   wherein the toaster is configured to vertically position a food product in a cooking cavity based on a type of food product selected using the user interface such that a center of the food product is at a center of a heating area in the cooking cavity.

2. The toaster of claim 1, wherein the toaster is configured to lower different types of food products to different locations within the cooking cavity based on a size of the food product selected using the user interface.

3. The toaster of claim 1, wherein the toaster is configured to position a first type of food product at a first stop in the cooking cavity, and to position a second type of food product at a second stop in the cooking cavity, where the first type of food product is different from the second type of food product and the first stop is different from the second stop.

4. The toaster of claim 3, wherein the first and second stops are determined based on a size of the first and second types of food products, respectively.

5. The toaster of claim 1, wherein the toaster is configured to position a food product in the cooking cavity based on a size of the food product.

6. The toaster of claim 1, wherein the toaster is configured to lower different food products to different heights in the cooking cavity.

7. The toaster of claim 1, wherein the user interface includes a food product selector having food product icons each representing a food product that can be selected for toasting by the toaster, wherein the food product icons are images of a food product.

8. The toaster of claim 7, wherein the user interface is configured to detect a hand gesture to select a food product icon, and in response to detecting the hand gesture, the user interface automatically moves the selected food product icon to a center of the food product selector and enlarges the selected food product icon.

9. The toaster of claim 8, wherein the user interface displays the selected food product icon 40-60% larger than unselected food product icons that are displayed on opposite sides of the selected food product icon.

10. The toaster of claim 8, wherein the user interface further displays a message below the selected food product icon that identifies the food product icon as a pastry, an English muffin, a slice of toast, a bagel, or a waffle.

11. The toaster of claim 8, wherein the user interface includes a cooking mode selector that includes cooking mode icons identified as fresh, frozen, and reheat, each cooking mode determining a toasting algorithm performed by the toaster.

12. The toaster of claim 11, wherein the user interface is configured to detect a hand gesture to select a cooking mode icon, and in response to detecting the hand gesture, the user interface automatically moves a selector icon over the selected cooking mode icon to highlight the selected cooking mode.

13. The toaster of claim 11, wherein the landing screen user interface includes a doneness selector having doneness icons each representing a doneness level, the user interface being configured to detect a hand gesture to select a doneness icon.

14. The toaster of claim 13, wherein in response to detecting a hand gesture, the user interface automatically moves a selector icon over the selected doneness icon.

15. The toaster of claim 14, wherein a color of the doneness icons varies depending on a doneness level associated with each doneness icon.

16. The toaster of claim 15, wherein the user interface changes a color of the selected food product icon based on the selected doneness icon.

17. The toaster of claim 1, wherein the user interface is configured to display a clean crumb tray reminder screen to empty a crumb tray after a predetermined number of toasting cycles.

18. The toaster of claim 1, wherein the toaster is configured to calculate a cooking cycle time based a combination of food product, cooking mode, and doneness level selected on the user interface, and an ambient heat in the cooking cavity and a line voltage reading.

19. The toaster of claim 1, wherein the user interface is configured to display a first type of message for a first portion of the cooking cycle, a second type of message for a second portion of the cooking cycle; a third type of message when 10-15 seconds of time remains in the cooking cycle; and a fourth type of message when the cooking cycle is complete and the food product is ready to be removed from the cooking cavity.

20. A toaster comprising:
a housing that defines one or more cooking cavities;
a lift in each cooking cavity to lower different food products to different vertical locations inside the cooking cavities;
heating elements located inside each cooking cavity, the toaster being operable to supply energy to the heating elements to toast and/or cook food products arranged inside the one or more cooking cavities; and
a user interface for selecting various combinations of food product, cooking mode, and doneness level;
wherein the user interface is operable by a user to control a cooking cycle performed in the one or more cooking cavities, and the lift is configured to position a food product to a vertical position in the cooking cavity based on a type of food product selected using the user interface such that a center of the food product is at a center of a heating area in the cooking cavity.

* * * * *

UNITED STATES PATENT AND TRADEMARK OFFICE
CERTIFICATE OF CORRECTION

PATENT NO. : 11,452,405 B2  
APPLICATION NO. : 17/128329  
DATED : September 27, 2022  
INVENTOR(S) : Philip C. Carbone et al.

It is certified that error appears in the above-identified patent and that said Letters Patent is hereby corrected as shown below:

In the Claims

At Column 22, Claim 13, Lines 60-61, "the landing screen user interface" should read -- the user interface --

Signed and Sealed this
Twenty-fifth Day of October, 2022

Katherine Kelly Vidal
*Director of the United States Patent and Trademark Office*